United States Patent
Isozaki et al.

(10) Patent No.: US 9,400,877 B2
(45) Date of Patent: Jul. 26, 2016

(54) SERVER DEVICE AND SERVICE PROVISION METHOD

(75) Inventors: Masaaki Isozaki, Kanagawa (JP); Masaaki Koyanagi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 70 days.

(21) Appl. No.: 13/413,976

(22) Filed: Mar. 7, 2012

(65) Prior Publication Data

US 2012/0254428 A1  Oct. 4, 2012

(30) Foreign Application Priority Data

Mar. 30, 2011  (JP) ................................. 2011-075769
Jan. 19, 2012  (JP) ................................. 2012-008594

(51) Int. Cl.
| | | |
|---|---|---|
| G06F 15/173 | (2006.01) | |
| G06F 21/31 | (2013.01) | |
| G06F 21/44 | (2013.01) | |
| H04L 29/06 | (2006.01) | |

(52) U.S. Cl.
CPC ................ *G06F 21/31* (2013.01); *G06F 21/44* (2013.01); *H04L 63/0876* (2013.01); *H04L 63/102* (2013.01); *H04L 63/107* (2013.01)

(58) Field of Classification Search
CPC ....... H04L 63/876; H04L 63/10; H04L 63/08; G06F 15/173
USPC ........................................................ 709/225
See application file for complete search history.

(56) References Cited

U.S. PATENT DOCUMENTS

| | | | | |
|---|---|---|---|---|
| 6,359,711 | B1 * | 3/2002 | Cole et al. ........................ | 398/58 |
| 7,610,391 | B2 * | 10/2009 | Dunn ............................ | 709/229 |
| 2006/0137005 | A1 * | 6/2006 | Park ................................ | 726/21 |
| 2010/0094754 | A1 * | 4/2010 | Bertran .................. | G06Q 20/40 |
| | | | | 705/44 |
| 2010/0223326 | A1 * | 9/2010 | Noldus et al. ................ | 709/203 |

FOREIGN PATENT DOCUMENTS

WO     WO 2005/006203     1/2005

* cited by examiner

*Primary Examiner* — Vivek Srivastava
*Assistant Examiner* — Karina J Garcia-Ching
(74) *Attorney, Agent, or Firm* — Chip Law Group

(57) ABSTRACT

A server device is provided, which includes a reception unit receiving device identification information of a client device and user identification information of a user of the client device from the client device; a device determination unit determining whether or not it is possible to grant the user authorization to use a service on the basis of the device identification information; a user determination unit determining whether or not it is possible to grant the user the authorization to use on the basis of the user identification information; and a transmission unit transmitting information on the authorizable services of the services, for which it is determined that it is possible to grant the user the authorization to use on the basis of the device identification information and the user identification information, to the client device.

17 Claims, 14 Drawing Sheets

SERVER DEVICE AND SERVICE PROVISION METHOD

BACKGROUND

The present disclosure relates to a server device and a service provision method.

Services, which are provided from a server to a client through a network, are often provided for a particular user who has been granted the authorization to use. For example, a user logs in to a server using a pre-registered user ID and password. The server identifies the user using the user ID, and provides a service that is available for the user who has been granted the authorization to use.

Further, in order to prevent unauthorized use of the user ID, a service may be provided to a particular client device that is used by a particular user. In this case, an ID or a name of the client device is used as information for identifying the client device. For example, Pamphlet of International Publication No. WO2005/006203 describes a technology that facilitates management of information for identifying a client device through registering the name of the client device that is input by a user in a server.

SUMMARY

However, recently, the use pattern of a client device by a user has been much more diversified. For example, in many cases, one user may use a plurality of client devices, or a plurality of users may share one client device. In view of such circumstances, the technology described in Pamphlet of International Publication No. WO2005/006203 is not necessarily sufficient to meet the requirements of service providers or users.

Accordingly, it is desirable to set a target of service provision more flexibly using information for identifying a user and information for identifying a client device.

According to an embodiment of the present disclosure, there is provided a server device which includes a reception unit receiving device identification information of a client device and user identification information of a user of the client device from the client device; a device determination unit determining whether or not it is possible to grant the user authorization to use a service on the basis of the device identification information; a user determination unit determining whether or not it is possible to grant the user the use authorization on the basis of the user identification information; and a transmission unit transmitting information on the authorizable services of the services, for which it is determined that it is possible to grant the user the use authorization on the basis of the device identification information and the user identification information, to the client device.

According to an embodiment of the present disclosure, there is provided a service provision method which includes receiving device identification information of a client device and user identification information of a user of the client device from the client device; determining whether or not it is possible to grant the user authorization to use a service on the basis of the device identification information; determining whether or not it is possible to grant the user the use authorization on the basis of the user identification information; and transmitting information on the authorizable services of the services, for which it is determined that it is possible to grant the user the use authorization on the basis of the device identification information and the user identification information, to the client device.

According to the present disclosure, whether or not it is possible to grant the user the authorization to use the service is determined by freely combining conditions that are set for the user or the client device.

As described above, according to the present disclosure, it is possible to set a target of service provision more flexibly using the information for identifying the user and the information for identifying the client device.

DETAILED DESCRIPTION OF EMBODIMENTS

Figure 1:
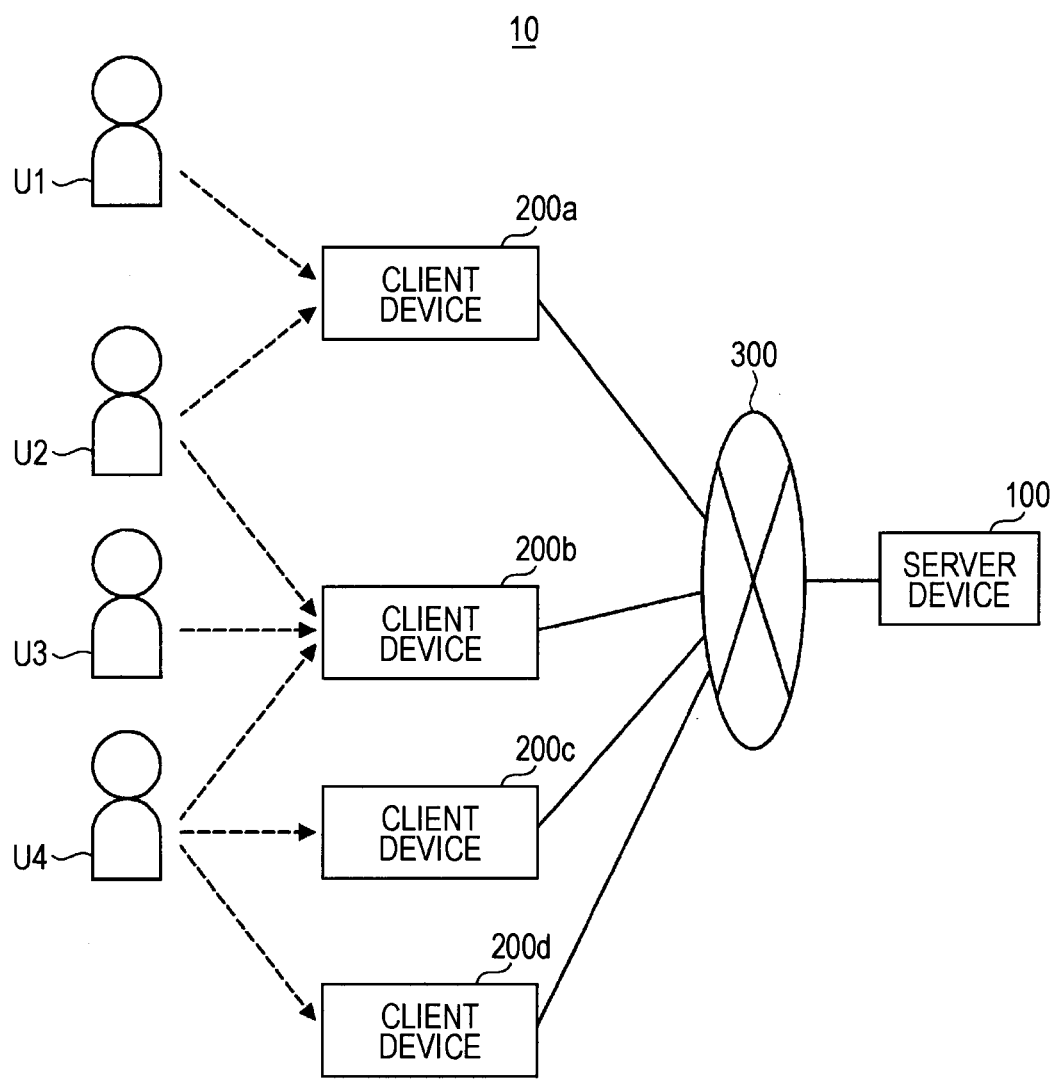
FIG. 1 is a diagram illustrating the schematic configuration of a service provision system according to a first embodiment of the present disclosure.

Hereinafter, examples of a best mode for carrying out the present disclosure will be described with reference to the accompanying drawings. Further, in the specification and drawings, the same reference numerals are used for constituent elements having substantially the same functional configurations, and duplicate explanation thereof will be omitted.

Further, the sequence of the description to be described hereinafter is as follows.

1. First embodiment
 1-1. System configuration
 1-2. Configuration of a server device
 1-3. Process of determining whether or not to grant authorization
 1-4. Flow of information between a server and a client
 1-5. Variations of beneficial service provision
2. Second embodiment
 2-1. Summary
 2-2. Configuration of a server device
 2-3. Process of determining whether or not to grant authorization
 2-4. Flow of information between a server and a client
3. Hardware configuration
4. Supplement

1. First Embodiment

1-1. System Configuration

First, referring to FIG. 1, the configuration of a service provision system according to a first embodiment of the present disclosure will be described. FIG. 1 is a diagram illustrating the schematic configuration of a service provision system 10 according to a first embodiment of the present disclosure. In the service provision system 10, a music distribution service is provided.

Referring to FIG. 1, the service provision system 10 includes a server device 100 and a client device 200. The server device 100 and the client device 200 are all connected to a network 300, and thus can communicate with each other. The client device 200 is used by a user U. With respect to one server device 100, a plurality of client devices 200 and a plurality of users may exist. In an illustrated example, client devices 200a to 200d and users U1 to U4 exist. However, the number of clients 200 and users U is not limited thereto.

The server device 100 is a device that provides a service to the user through the client device 200. The server device 100 may not necessarily be limited to a single device, and the function of the server device 100 may be implemented by a plurality of devices connected to the network 300. Further, in an example to be described hereinafter, the service that is provided by the server device 100 is the music distribution service. However, services that can be provided by the server device according to the present disclosure are not limited thereto, but may be all kinds of services that can be provided to the user U, for example, any other content provision service such as a video content provision service, an information provision service such as a navigation information provision service, and the like. The functional configuration of the server device 100 and the hardware configuration thereof will be described later.

The client device 200 is a device that receives information from the server device 100 through the network 300, and provides a service to the user U using the received information. The client device 200 provides the service to the user U through displaying music that can be provided on the basis of the information received from the server device 100 or receiving and reproducing audio data of the music from the server device 100, which is selected by the user. The client devices 200 may be all devices that can output images or audio to the user U, such as PCs (Personal Computers) of a desktop type, a notebook type, or a tablet type, game machines including portable types, mobile phones, and the like.

Further, the client device 200 has a device ID as device identification information. The device ID, for example, is an inherent value that is allocated to each client device 200 at the time of manufacturing the client device 200. The device ID is provided to the server device 100 together with the information that is transmitted from the client device 200. The server device 100 can identify the client device 200 that has transmitted the information with reference to the received device ID.

The network 300 is a network through which the server device 100 and the client device 200 are connected to each other. The network 300 may be a wired or wireless communication network including the Internet, LAN (Local Area Network), or the like.

The user U is a user who uses the client device 200. The user U has a user ID as user identification information. The user ID, for example, is an inherent value that is allocated to each user U at the time when the user U makes user registration for using the service by the server device 100. The user ID is provided to the server device 100 together with the information that is transmitted from the client device 200. The server device 100 can identify the user U who uses the client device 200 that has transmitted the information with reference to the received user ID.

In the illustrated example, a client device 200a is used by users U1 and U2. Further, the client device 200b is used by users U2 to U4. As described above, the client device 200 can be shared by the plurality of users U having different user IDs. Further, in the service provision system 10, the user U who uses a single client device 200, such as the client devices 200c and 200d used by the user U4, the client device 200 that is used by a single user U may exist.

On the other hand, the user U2 uses the client devices 200a and 200b. The user U4 uses eh client device 200b to 200d. As described above, the user may use the plurality of client devices 200a having different device IDs. Further, in the service provision system 10, such as the user U1 who uses the client device 200a and the user U3 who uses the client device 200b, the user U who uses a single client device 200 may exist.

1-2. Configuration of a Server Device

Figure 2:
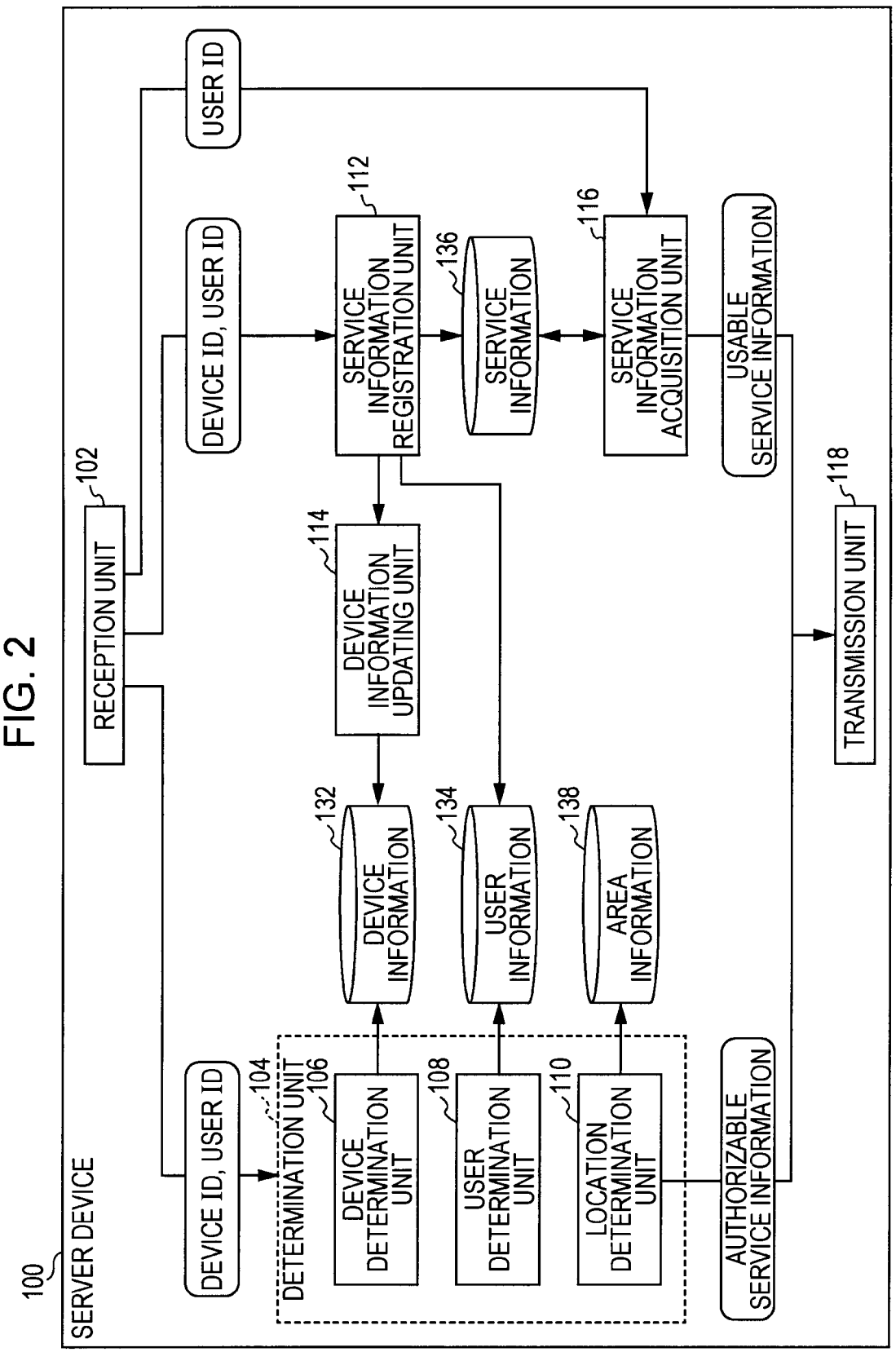
FIG. 2 is a diagram illustrating the schematic functional configuration of a server device according to a first embodiment of the present disclosure.

Next, referring to FIG. 2, the configuration of the server device according to the first embodiment of the present disclosure will be described. FIG. 2 is a diagram illustrating the schematic functional configuration of a server device 100 according to a first embodiment of the present disclosure.

Further, in the following description, in order to describe the user U and the client device 200, FIG. 1 will also be referred to when appropriate. Further, in FIG. 2, a portion of the functional configuration of the server device 100, which is related to granting the user U with service authorization, is mainly shown. Accordingly, in addition to such a functional configuration, the server device 100 may include a functional configuration for providing the service to the user U who has the authorization to use the service. As this functional configuration, all functional configurations, which are known as functional configurations for providing the service to the user U through the network 300, may be used.

Referring to FIG. 2, the server device 100 includes a reception unit 102, a determination unit 104, a service information registration unit 112, a device information updating unit 114, a service information acquisition unit 116, and a transmission unit 118. Among these, the reception unit 102 and the transmission unit 118 are communication units which are implemented by a communication device or the like. Further, the determination unit 104, the service information registration unit 112, the device information updating unit 114, and the service information acquisition unit 116 are processing units that are implemented by a CPU (Central Processing Unit), a ROM (Read Only Memory), and a RAM (Random Access Memory). Further, the above-described units refer to, register, or update device information 132, user information 134, service information 136, and area information 138. Such information may be stored in a storage device inside or outside the server device 100.

Here, authorization to use services that is provided by the server device 100 will be briefly described. Services, which are provided by the server device 100, are provided to the user U who has the use authorization. The user U inputs a user ID and a password onto the client device 200, and transmits the input user ID and password to the server device 100 to log in to the server device 100. The server device 100 provides the service, of which the use authorization has been granted to the user U, to the user U. The unit of service use authorization granted to the user U is also called a SKU (Stock Keeping Unit). The user can use the service through having been granted the use authorization such as purchasing the service in the SKU.

(Reception Unit)

The reception unit 102 receives the device ID and the user ID through communications with the client device 200. As described above, the device ID is the device identification information for identifying the client device 200. Further, the user ID is the user identification information for identifying the user U. The reception unit 102 may receive an authorization request that requests to grant the user U with authorization to use the service through service purchase or the like or location information that indicates the location of the client device 200 from the client device 200.

Here, the server device 100 may have the configuration that can verify the presence of any counterfeit information, such as the device ID or the like, which is transmitted from the client device 200. For example, as a device ID that is allocated to each client device 200 at the time of manufacturing, a value that is obtained by adding a verification code to an original device ID value and encrypting the device ID value with the verification code in a predetermined order may be used. In this case, the device ID information received from the client device 200 is decoded in the predetermined order in the server device 100. By checking the validity of the verification code that is included in the decoded information, it is possible to determine whether or not the device ID included in the received information is authorized.

(Determination Unit)

The determination unit 104 determines whether or not it is possible to grant the user U with authorization to use the service. The determination unit 104 includes a device determination unit 106, a user determination unit 108, and a location determination unit 110, and makes a determination on the basis of at least the device ID and the user ID received by the reception unit 102. For example, the determination unit 104 may determine whether or not it is possible to grant the user U with authorization to use each service that can be provided by the server device 100, and provide information of the service, for which it is determined that it is possible to grant the user the use authorization, to the transmission unit 118 as the authorizable services information.

(Device Determination Unit)

The device determination unit 106 determines whether or not it is possible to grant the user U with authorization to use the service on the basis of the device ID. As described above, since the device ID has an inherent value for each client device 200, the device determination unit 106 can uniquely identify the client device 200 through the device ID. Through this, the device determination unit 106 can determine whether or not it is possible to grant the user U with authorization to use the service depending on the client device 200 used by the user U. The device determination unit 106 refers to the device information 132 for the determination. The device information 132 includes information on the authorization to use the service in association with the device ID.

(Example of Device Purchase Benefit)

As an example of determining the use authorization depending on the client device 200, there is a device purchase benefit that is attached to the client device 200. The device purchase benefit is the benefit that can grant the authorization to use a specific service with respect to the specific client device 200 in the case of using the specific client device 200 after purchasing the same, and for example, is used for sales promotion of the device and the like.

For example, it is assumed that the purchase benefit, which can grant the authorization to use service A, is attached to the client devices 200a and 200c. In this case, in the device information 132, device IDs of the client devices 200a and 200c appear as the target device IDs for the purchase benefit of service A. The device determination unit 106 determines that it is possible to grant the user U with authorization to use service A only in the case where the device determination unit 106 acquires the device IDs of the client devices 200a and 200c from the reception unit 102.

Specifically, in the case where the user U2 uses the target client device 200a for the benefit, the device determination unit 106 determines that it is possible to grant the user U2 with authorization to use service A. On the other hand, in the case where the same user U2 uses the client device 200b except for the target client device for the benefit, the device determination unit 106 determines that it is not possible to grant the user U2 with authorization to use service A.

(Example of Limit on the Number of Authorizable Users)

As another example of determining the use authorization depending on the client device 200, there is a limit to the user U who is authorizable to use the service in the client device 200. For example, if the client device 200 is shared by many users in the case where it is possible to grant the user U with authorization in a specific client device 200 as in an example of the device purchase benefit, the use authorization is granted to the user U without limit. The upper limit of the authorizable user U may be used to prevent this situation.

For example, in an example of device purchase benefit, it is assumed that the authorization to use service A in the client device 200a can be granted to only one user U. In this case, the device information 132, together with the target device ID for the purchase benefit of service A, includes information that indicates whether or not it is possible to grant the authorization to use service A with respect to each device ID. The device determination unit 106 determines that it is possible to grant the user U with the use authorization only in the case where the authorization to use service A has not yet been granted to the user U in the respective client devices 200a and 200c.

Specifically, in the case where the user U1 first uses the client device 200a after purchasing service A, the device determination unit 106 determines that it is possible to grant the user U1 with authorization to use service A. Here, in the case where the authorization to use service A has been granted to the user U1 using the client device 200, the device information updating unit 114, to which information from the service information registration unit 112 has been provided, adds the information indicating that the use authorization has been granted to the user U to the device ID of the client device 200a to the device information 132. Thereafter, if another user U2 uses the client device 200a, the device determination unit 106 determines that it is not possible to grant the user U2 with the authorization to use service A since the device ID of the client device 200a is included in the device ID for which the authorization to use service A has already been granted.

Further, in the device information 132 in the above-described example, the upper limit of the user U who is authorizable to use service A in each device ID may be set as a number. In this case, when the use authorization is granted to the user U using each client device 200, the upper limit value is decreased from a predetermined initial value by the device information updating unit 114. If the upper limit value is 0, the device determination unit 106 determines that it is not possible to grant the user U with the authorization to use service A. Through this, it is possible for the client device 200 to limit the number of users U, to whom the authorization to use service A is granted, to an arbitrary number.

(User Determination Unit)

The user determination unit 108 determines whether or not it is possible to grant the user A with authorization to use the service on the basis of the user ID. As described above, since the user ID has an inherent value for each user U, the user determination unit 108 can uniquely identify the user U through the user ID. Through this, the user determination unit 108 can determine whether or not it is possible to grant the user U with authorization to use the service depending on the user U. The user determination unit 108 refers to the user information 134 for the determination. The user information 134 includes information on the authorization to use the service in association with the user ID.

(Example of Exclusive Relationship Between Services)

As an example of determining the use authorization depending on the user U, there is a determination by the exclusive relationship between services of which the use authorization is granted to the user U. In the case of a music distribution service, the exclusive relationship between services, for example, may exist between the trial version and regular version of the same content or between the test versions of the same content. This is because it causes confusion among users to grant the user U, who already has the authorization to use the regular version of the content, with the authorization to use the test version of the content, and it rather hinders sales of the content of the regular version to allow repeated use of the trial version of the content.

For example, it is assumed that for content P of a music distribution service, there is service A of a trial version for a limited time and service B of a regular version, and the authorization to use service A has been granted to the user U1 and the authorization to use service B has been granted to the user U2. In the case where the authorization to use service A or service B has already been granted, service A is an exclusive service as seen from these services. In this case, user information 134, that is, information that indicates that the authorization to use service A has been granted to the user ID of the user U1 and information that indicates that the authorization to use service B has been granted to the user ID of the user U2, has been registered in the service information registration unit 112. Referring to this information, the user determination unit 108 determines that it is not possible to grant the users U1 and U2, to whom the authorization to use services A and B that are mutually exclusive with service A has been granted, with authorization to use service A.

(Location Determination Unit)

The location determination unit 110 determines whether or not it is possible to grant the user U with authorization to use the service on the basis of the location of the client device 200. The location of the client device 200, for example, may be acquired on the basis of the location information that the reception unit 102 receives from the client device 200. The location information, for example, may be an IP address of the client device 200 in the case where the client device 200 communicates with the server device 100 using an IP (Internet Protocol). It is possible to acquire the location of the client device 200 from the IP address using the existing technology. Further, the location information of the client device 200 may be acquired from the registration information of the user U that is acquired on the basis of the user ID. The location determination unit 110 refers to the area information 138 for the above-described determination. The area information 138 includes information on the service use authorization that is related to an area.

As an example of determining the use authorization depending on the location of the client device 200, service provision may be limited by the copyright in various areas. For example, it is assumed that for the copyright, provision of service A is possible in a certain area A, but is not possible in another area B. Further, it is assumed that the client device 200a is present in the area A and the client device 200b is present in the area B. In this case, the area information 138 is an area in which the service A can be provided, and includes information that indicates the area A. Referring to this information, the location determination unit 110 determines that it is possible to grant the user U with authorization to use service A only with respect to the client device 200 that is present in the area A. Specifically, in the case where the user U2 uses the client device 200a in the area A, the location determination unit 110 determines that it is possible to grant the user U2 with authorization to use service A. On the other hand, in the case where the user U2 uses the client device 200b in the area B, the location determination unit 110 determines that it is not possible to grant the user U2 with authorization to use service A.

(Service Information Registration Unit)

The service information registration unit 112 grants the user U with authorization to use the service through registration of information of the service that is designated in response to the authorization request received by the reception unit 102 in the user information 134 and the service information 136 in association with the user ID. Through this, the corresponding service is registered in the user information 134 and the service information 136 as a usable service of the user U. The user information 134, for example, may be referred to in the case where the user determination unit 108 determines the exclusive relationship between services. Further, the service information 136 may be referred to in the case where the service information acquisition unit 116 acquires the usable service information of the user U. Further, when granting the user U with authorization to use the service, the service information registration unit 112 provides the device ID of the client device 200 that is received by the reception unit 102 and information of the service of which the use authorization is granted to the user U to the device information updating unit 114.

Here, the service information registration unit 112 may register information on a validity period of the service for the user U in the service information 136 in association with the user ID. Through this, for example, only in a predetermined validity period, the service information acquisition unit 116 can acquire the information on the validity period in conjunction with the information on the usable service of the trial version.

(Device Information Updating Unit)

The device information updating unit 114 updates the device information 132 depending on granting of the user U with authorization to use the service in the client device 200 through the service information registration unit 112. The device information updating unit 114 registers the device ID of the client device 200 provided from the service information registration unit 112 in the device information 132 in association with the information of service A of which the use authorization is granted to the user U. Through this, the device ID of the client device 200 is registered in the device information 132 as the device ID that is used to grant the user U with authorization to use service A. This device information 132, for example, may be referred to in the case where the device determination unit 106 determines the upper limit of the number of authorizable users.

(Service Information Acquisition Unit)

The service information acquisition unit 116 acquires information of the service that can be used by the user U from the service information 136. The service information acquisition unit 116 acquires and provides the information of the service that can be used by the user U to the transmission unit 118 with reference to the service information 136 using the user ID of the user U that is received by the reception unit 102. Here, the service information acquisition unit 116 may acquire the usable service information of the information provided from the reception unit 102 from the service information 136 on the basis of the user ID regardless of the device ID. Through this, even in the case where the user U uses any client device 200, it becomes possible to acquire the same usable service information.

By means of the above-described configuration, for example, it is possible to use the service, of which the use authorization is acquired by the user U using the purchase benefit of the device. That is, although the acquisition of the authorization to use the service is limited to the device to which the purchase benefit is attached, the use of the service is possible even in another device. Through this, the authorization to use the service, which comes with the device purchase benefit can be used more easily, it is possible to increase the effectiveness of sales promotion through increase of attraction of the device purchase benefit for the user.

(Transmission Unit)

The transmission unit 118 transmits authorizable service information and usable service information through communications with the client device 200. As described above, the authorizable service information is the information of the service of which the use authorization can be granted to the user U who uses the client device 200, and is provided from the determination unit 104. Further, the usable service information is the information of the service of which the use authorization has already been granted to the user U who uses the client device 200, and is provided from the service information acquisition unit 116. The flow of information between the server device 100 and the client device 200, which includes such information, will be described later.

1-3. Process of Determining Whether or not to Grant Authorization

Figure 3:
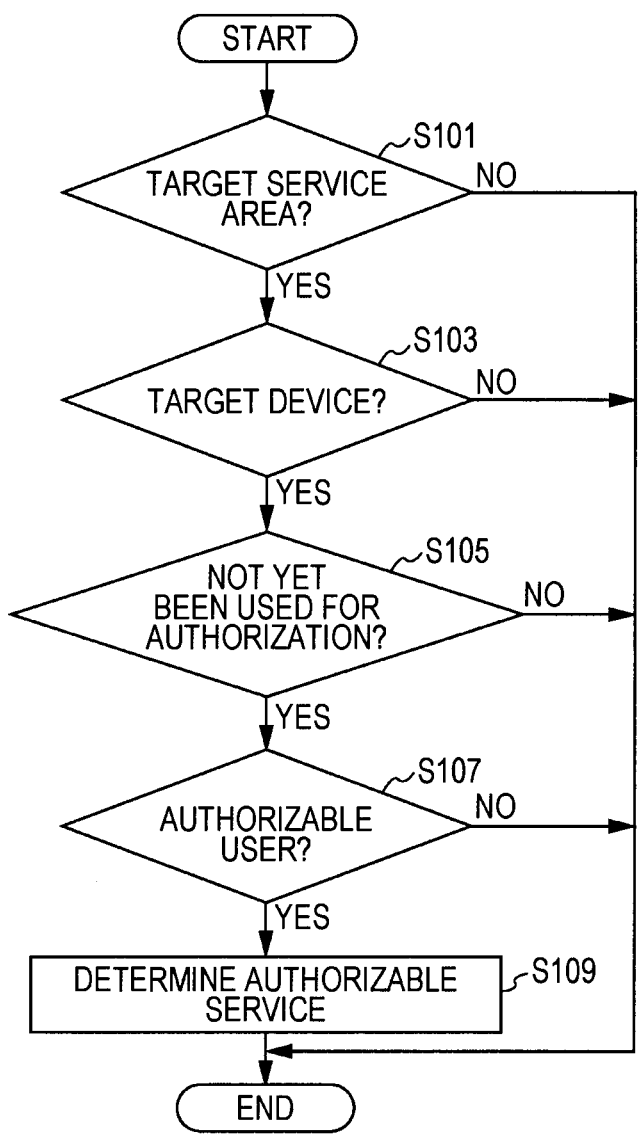
FIG. 3 is a flowchart illustrating an example of a process of determining whether or not to grant the use authorization in a server device according to a first embodiment of the present disclosure.

Next, referring to FIG. 3, an example of a process of determining whether or not to grant the use authorization in the server device according to the first embodiment of the present disclosure will be described. FIG. 3 is a flowchart illustrating an example of a process of determining whether or not to grant the use authorization in the server device 100 according to the first embodiment of the present disclosure.

The process to be described hereinafter is a process in which the determination unit 104 determines whether or not to grant the user U with the use authorization for each service that can be provided by the server device 100. The determination unit 104 may generate the authorizable service information that is the information of the service of which the use authorization can be granted to the user U through execution of the following process, for example, for each service that can be provided by the server device 100.

First, the location determination unit 110 determines whether or not the location of the client device 200 is a target service area on the basis of the location information of the client device 200 that is received by the reception unit 102 (step S101). Here, the target service area is determined, for example, on the basis of the copyright limits in each country.

If it is determined that the location of the client device 200 is the target service area in step S101, the device determination unit 106 determines whether or not the client device 200 is the target device for the authorization to use the service on the basis of the device ID of the client device 200 that is received by the reception unit 102 (step S103). Here, the target device for the use authorization is a device, for example, to which the authorization to use a specific service is attached as the purchase benefit. The device determination unit 106 executes the above-described determination through referring to the device ID of the target device for the authorization to use the service, which is included in the device information 132. Further, if the information of the device ID as described above has the configuration that can verify the existence of the counterfeit, the device determination unit 106 determines that the client device 200 is the target device for the use authorization only in the case where it is confirmed that the device ID is authorized through confirmation of the code for decryption and verification.

If it is determined that the client device 200 is the target device for the use authorization in step S103, the device determination unit 106 determines whether or not the client device 200 has not yet been used for authorization to use the service for the user U on the basis of the device ID of the client device 200 that is received by the reception unit 102 (step S105). The device determination unit 106 executes the above-described determination through referring to the information that indicates whether or not the authorization to use the server is granted to each device ID included in the device information 132.

If it is determined that the client device 200 has not yet been used for the authorization to use the service for the user U in step S105, the user determination unit 108 determines whether or not the user U is a user to whom the authorization to use the service can be granted on the basis of the user ID of the user U that is received by the reception unit 102 (step S107). Here, the user to which the use authorization can be granted, for example, is a user to which the authorization to use the service, for which the exclusive relationship exists between the service to be determined, has not been granted. The user determination unit 108 executes the above-described determination through referring to the information of the service included in the user information 134, of which the use authorization is granted to each user U.

If it is determined that the user U is a user to whom the authorization to use the service can be granted in step S107, the determination unit 104 determines that the service to be determined is a service of which the use authorization can be granted to the user U (step S109). The information of the service of which the use authorization can be granted to the user U is transmitted to the client device 200 through the transmission unit 118 as the authorizable service information.

1-4. Flow of Information Between a Server and a Client

Figure 4:
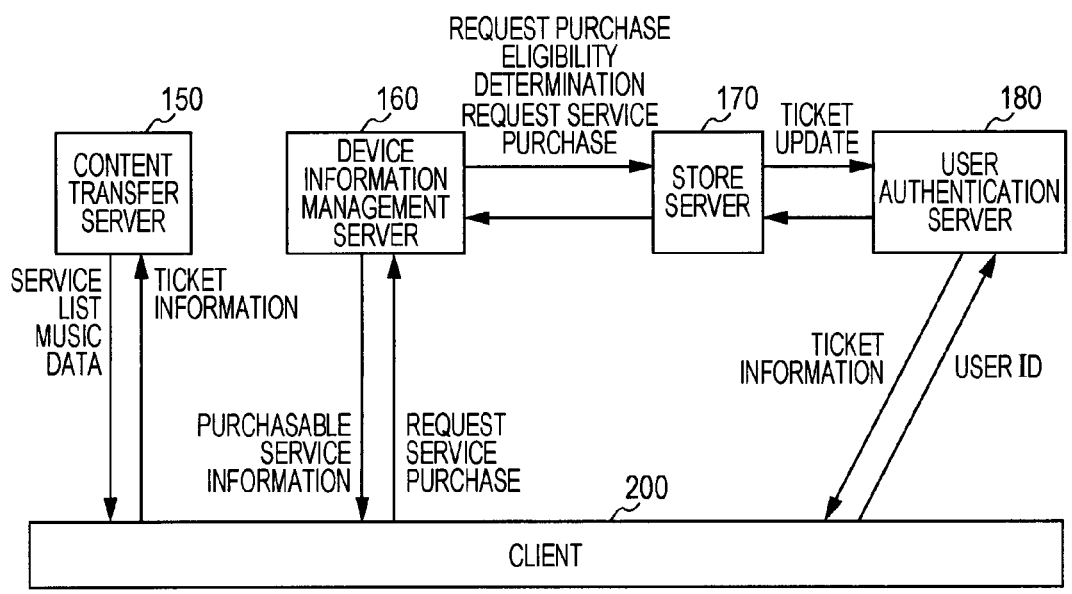
FIG. 4 is a diagram illustrating an example of implementation of a server device and a client device according to a first embodiment of the present disclosure.
Figure 5:
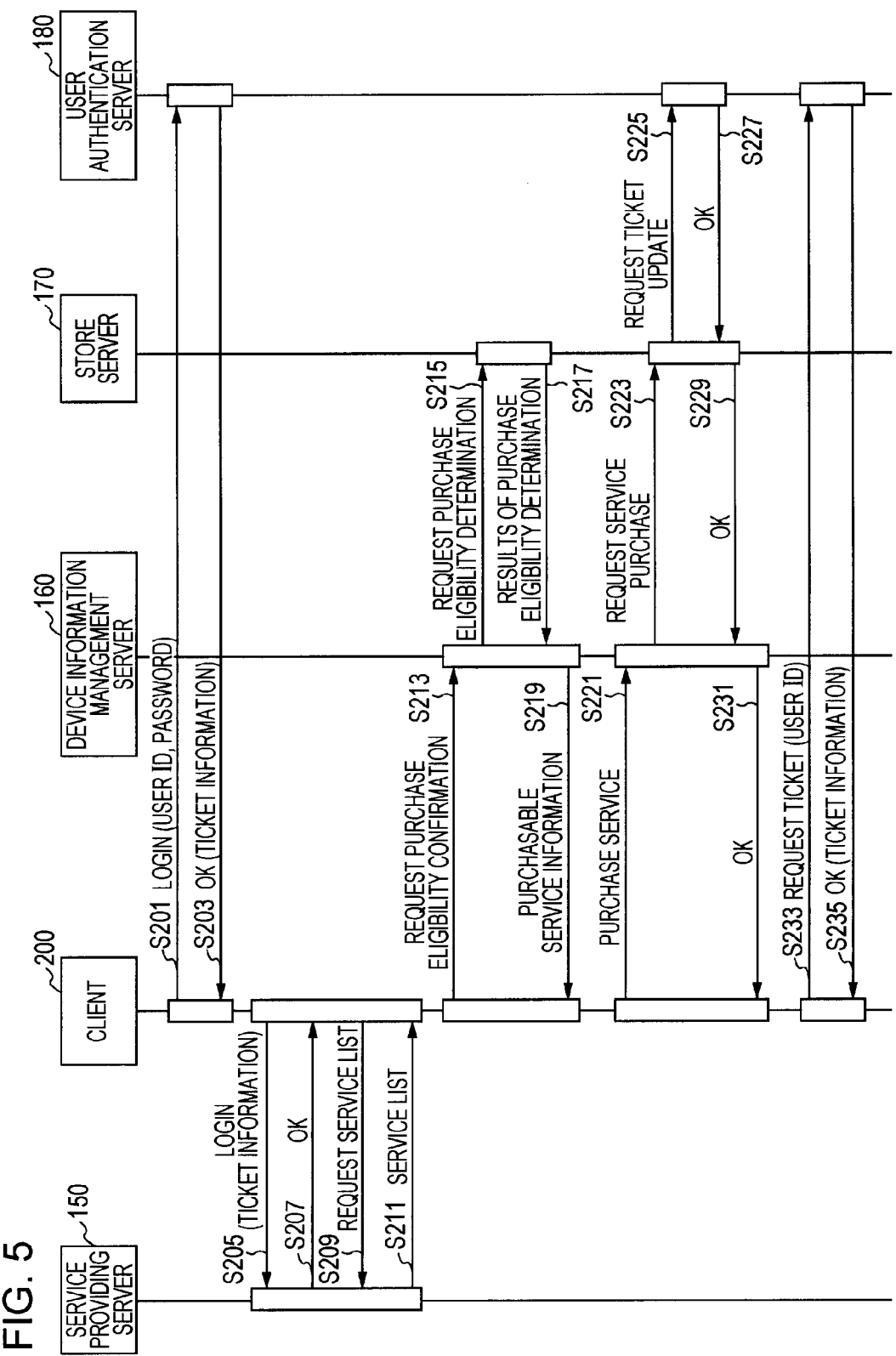
FIG. 5 is a sequence diagram illustrating flow of information between respective devices in the example of FIG. 4.
Figure 6:
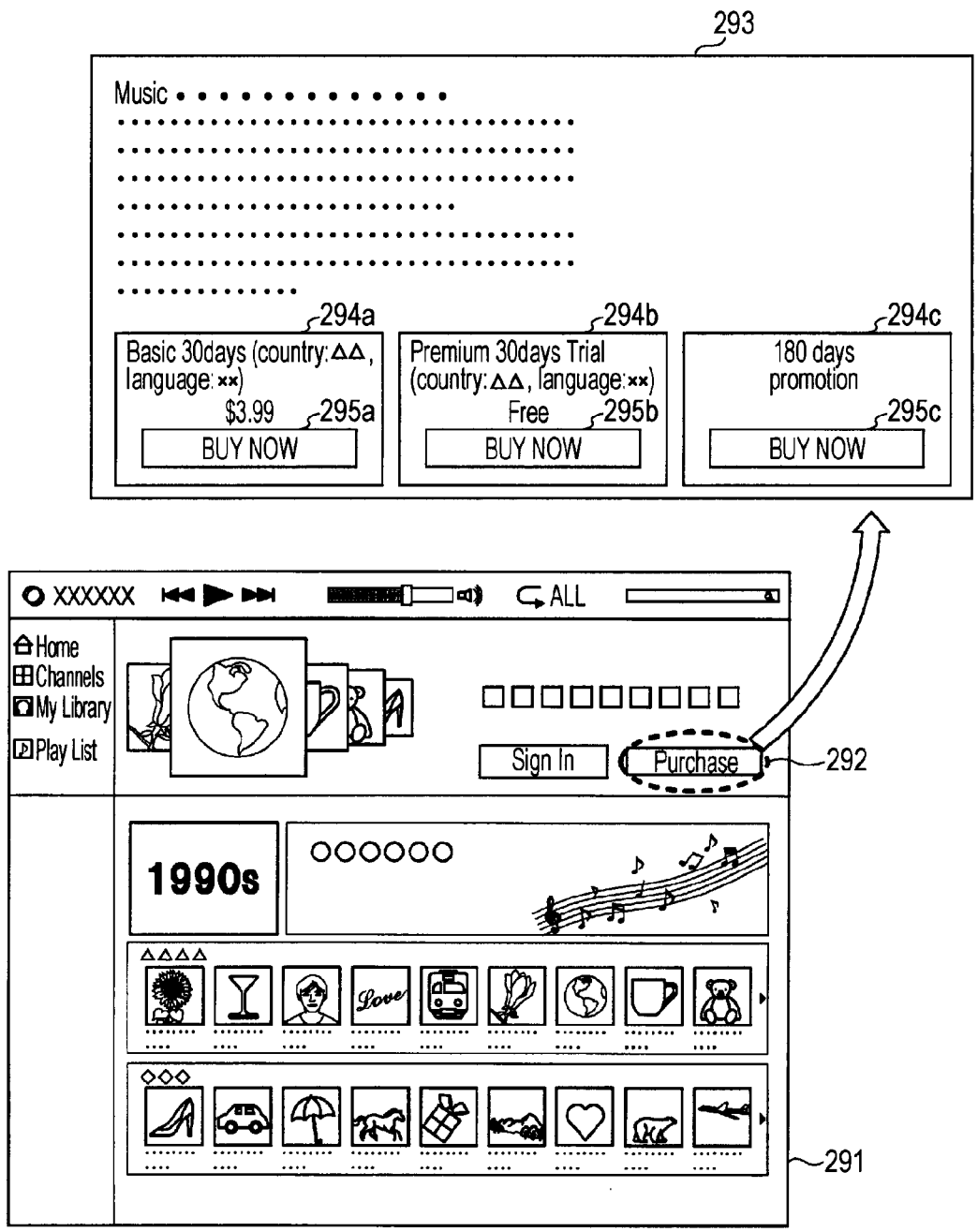
FIG. 6 is a diagram illustrating an example of screen display of a client device in the example of FIG. 5.

Next, referring to FIGS. 4 to 6, the flow of information between the server and the client according to the first embodiment of the present disclosure will be described. FIG. 4 is a diagram illustrating an example of implementation of the server device 100 and the client device 200 according to the first embodiment of the present disclosure. FIG. 5 is a sequence diagram illustrating the flow of information between the respective devices in the example of FIG. 4. FIG. 6 is a diagram illustrating an example of screen display of the client device 200 in the example of FIG. 5.

(Implementation Example of a Server Device)

Referring to FIG. 4, according to this embodiment, the server device 100 may be implemented as a content distribution server 150, a device information management server 160, a store server 170, and a user authentication server 180. Hereinafter, functions of the respective servers will be described.

The content distribution server 150 is a server that has functions of distributing music data that is content and distributing applications for using the service in a music distribution service that is a service according to this embodiment. The client device 200 transmits ticket information to the content distribution server 150. The ticket information is information of a usable service of the user U in the music distribution service. The content distribution server 150 distributes the music data or the like to the client device 200 on the basis of the ticket information.

Further, the content distribution server 150 transmits a service list to the client device 200. The service list is a list of services that can be provided by the content distribution server 150. The services that can be provided by the content distribution server 150 may be divided into various kinds according to not only the difference in music but also the difference in provision condition. For example, a regular version and a trial version having different use period, even in the same music, may be provided as different services. For example, the service list may be a list that comprehensively includes such services.

The device information management server 160 is a server which has the functions of the device determination unit 106, the location determination unit 110, and the device information updating unit 114, and maintains the device information 132 and the area information 138. The device information management server 160 transmits purchasable service information to the client device 200. The purchasable service information is information of the service of which the use authorization can be granted to the user U through purchase. The purchasable service information may be obtained by determining whether or not it is possible to grant the user who uses the client device 200 with the use authorization through purchase with respect to each service included in the service list that the client device 200 acquires from the content distribution server 150. With respect to the determination on the basis of the user ID of the user U of the above-described determinations, the device information management server 160 requests the determination from a store server 170.

Further, the device information management server 160 requests the service purchase from the store server 170 according to a service purchase request of the client device 200. That is, the service purchase request from the user U is not directly transmitted to the store server 170, but is transmitted through the device information management server 160. Further, the service purchase request is an authorization request that requests use authorization to the user U through purchase. Through this, when the service purchase through the store server 170 is successful and a response is transmitted to the client device 200, the device information management server 160 can reflect the result of the service purchase in the device information 132.

The store server 170 is a server which has the functions of the user determination unit 108 and the service information registration unit 112, and maintains the user information 134. The store server 170 grants the user U with the authorization to use the service according to the service purchase request from the device information management server 160. At this time, the store server 170 registers usable service information of the user U in the user information 134 and provides the usable service information of the user U to the user authentication server 180.

Further, the store server 170 determines whether or not it is possible to grant the user U with the authorization to use the service according to the request from the device information management server 160. The store server 170 refers to the user information 134 using the user ID, determines service use authorization for the user U, and transmits the result of the determination to the device information management server 160.

The user authentication server 180 is a server which has the function of the above-described service information acquisition unit 116, and maintains the service information 136. The user authentication server 180 receives the user ID of the user U from the client device 200, and transmits the usable service information of the user U that is obtained with reference to the service information 136 using the corresponding user ID to the client device 200 as the ticket information. The usable service information of the user U that is included in the service information 136, that is, the ticket information, is updated on the basis of the usable service information of the user U that the store server 170 provides to the user authentication server 180 when processing the service purchase.

(Flow of Information Between Devices)

Referring to FIG. 5, the flow of information between respective servers will be described. First, the client device 200 logs in to the user authentication server 180 through transmission of the user ID and the password input by the user U (step S201). If the validity of the received user ID and password is confirmed, the user authentication server 180 transmits the usable service information of the user U that is acquired from the service information 136 using the user ID, that is, the ticket information, to the client device 200 (step S203). In the above-described steps, the client device 200 acquires the ticket information of the user U.

Next, the client device 200 logs in to the content distribution server 150 through transmission of the ticket information (step S205). If the validity of the received ticket information is confirmed, the content distribution server 150 transmits a response that approves the login to the client device 200 (step S207). The client device 200, which has received the response approving the login, transmits the server list request to the content distribution server 150 (step S209). The content distribution server 150 transmits the service list to the client device 200 according to the received service list request (step S211). As described above, the service list is a service list that can be provided by the content distribution server 150. In the above-described steps, the client device 200 acquires the service list that comprehensively includes services that can be provided by the content distribution server 150. Further, at this time, it is not known which service included in the service list the user U can purchase.

Next, the client device 200 transmits a purchase eligibility confirmation request to the device information management server 160 together with the service list acquired from the content distribution server 150 (step S213). The device information management server 160 determines whether or not the user U who uses the client device 200 has purchase eligibility, that is, whether or not it is possible to grant the user U with the use authorization, with respect to each service included in the service list. The device information management server 160 executes the above-described determination with reference to the device information 132 and the area information 138, and request the determination of the purchase eligibility that refers to the user information 134 from the store server 170 (step S215).

The store server 170, which has received the purchase eligibility determination request, determines whether or not it is possible to grant the user U with the use authorization with respect to each service included in the service list with reference to the user information 134, and transmits the result of the determination to the device information management server 160 (step S217). The device information management server 160 transmits the authorizable service information that is obtained as the result of the determination to the client device 200 as the purchasable service information (step S219). In the above-described steps, the client device 200 acquires the service information that can be purchased by the user U of the services included in the service list that is acquired from the content distribution server 150. For example, the client device 200 may presents the purchasable service information to the user U and select the purchased service.

If a purchase instruction is acquired from the user U with respect to an arbitrary service of the purchasable services, the client device 200 transmits the service purchase request to the device information management server 160 (step S221). The service purchase request corresponds to the service authorization request. Further, the service purchase mentioned herein includes not only the price-paid purchase but also a procedure for start of using the free trial-version service. The device information management server 160 that has received the service purchase request transmits the service purchase request to the store server 170 (step S223). Further, at this time, in the device information management server 160, the determination of whether or not to grant the user U with the use authorization may be executed again. The store server 170 that has received the service purchase request registers the usable service information of the user U in the user information 134 and transmits a ticket update request to the user authentication server 180 (step S225). The ticket update request includes at least the ID of the user U and information of the service newly purchased.

The user authentication server 180 that has received the ticket update request updates the ticket information that is included in the service information 136, and if the update is successful, transmits a response indicating that the update is successful to the store server 170 (step S227). The store server 170 that has received the response reflects the result of the service purchase in the user information 134, and transmits the response indicating that the process of purchasing the service is successful to the device information management server 160 (step S229). The device information management server 160 that has received the response reflects the result of the service purchase in the device information 132, and transmits the response indicating that the process of purchasing the service is successful to the client device 200 (step S231). Through the above-described steps, the user U purchases the service, and the authorization to use the corresponding service is granted to the user U. Further, the grant of the authorization to use the service is reflected in the device information 132, the user information 134, and the service information 136.

The client device 200 that has received the response indicating that the service purchase is successful transmits the request for the updated ticket information to the user authentication server 180 together with the user ID (step S233). The user authentication server 180 that has received the request for the ticket information transmits the usable service information of the user U, which is acquired again from the service information 136 using the user ID, that is, the ticket information, to the client device 200 (step S235). Through the above-described steps, the client device 200 acquires the updated ticket information through the purchase of the service by the user U. The client device 200 can be provided with the service newly purchased through transmission to the updated ticket information to the content distribution server 150.

(Example of Screen Display)

In FIG. 6, in the above-described example, a menu screen 291 and a purchasable service display screen 293 of screens that can be displayed on the client device 200 are illustrated.

The menu screen 291 is a menu screen that can be displayed in the case where an application for using a music distribution service is executed. In the menu screen 291, a purchasable service confirmation button 292 is arranged. If the purchasable service confirmation button 292 is pressed through an operation of the user U, the purchasable service display screen 293 is displayed.

The purchasable service display screen 293 is a screen that displays services that can be purchased by the user in the client device 200. The purchasable service display screen 293 may be displayed after the step S219 in the example of FIG. 5. Purchasable service displays 294*a* to 294*c* which are displayed on the purchasable service display screen 293 are services which are included in the service list that is acquired from the content distribution server 150, and determined as the purchasable devices as the results of the determination through the device information management server 160 and the store server 170. As illustrated, the purchasable services may include paid and free services. When one of the purchase buttons 295*a* to 295*c* of the purchasable service displays 294*a* to 294*c* is pressed through the operation of the user U, the client device 200 transmits the service purchase request to the device information management server 160.

1-5. Variation of Beneficial Service Provision

Next, referring to FIGS. 7 to 10, variations of beneficial services that can be provided according to the first embodiment of the present disclosure will be described. FIGS. 7 to 10 are all diagrams illustrating examples of beneficial service provision according to the first embodiment of the present disclosure. According to the beneficial service in the following example, in the case where the client device 200 is a target device for the benefit, the purchase eligibility of the beneficial service A is given to the user U who uses the client device 200.

Here, the beneficial service A is a service that can use content P only for a use period of X days. On the other hand, in the content P, service B that can be used for a longer time as a regular version is set, and the exclusive relationship is set between the beneficial service A and the service B. Further, the exclusive relationship is set between the beneficial service A and the beneficial service A. That is, the beneficial service A is a service that can be purchased only once.

Figure 7:
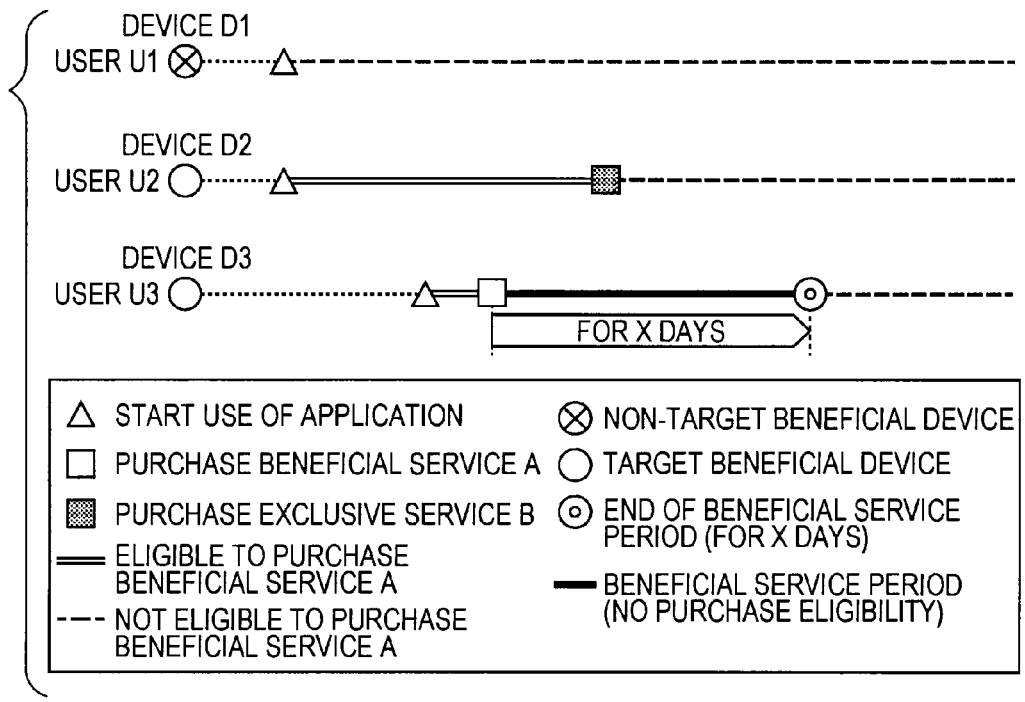
FIG. 7 is a diagram illustrating an example of beneficial service provision according to a first embodiment of the present disclosure.

FIG. 7 shows an example in the case where the users U1 to U3 use different devices D1 to D3 as the client devices 200. The device D1 is not a target beneficial device, and the devices D2 and D3 are target beneficial devices.

Since the device D1 is not a target beneficial device, the eligibility to purchase the beneficial service A is not given to the user U1 even after the user U1 starts the use of the application for suing the service. In the case where the user U1 desires to use the content P, for example, it is necessary to purchase the service A that is a regular version.

On the other hand, since the device D2 is the target beneficial device, the eligibility to purchase the beneficial service A is given to the user U2 if the user U2 starts to use the application for using the service. If the user U2 executes the purchase process of the beneficial service A with the device D2 in this state, it is possible that the user U2 acquires the use authorization of the beneficial service A.

However, the user U2 is purchasing the service B of the regular version that is in exclusive relationship with the beneficial service A. In this case, after the purchase of the service B, the eligibility for the user U1 to purchase the beneficial service A disappears. Accordingly, thereafter, so far as the user U2 uses the device D2 that is the target beneficial device, the eligibility to purchase the beneficial service A is not given to the device D2.

Since the device D3 is also the target beneficial device, in the same manner as the device D2, the eligibility to purchase the beneficial service A is given to the user U3. The user U3 purchases the beneficial service A, and starts the use period for X days. Since the beneficial service A is a service that can be purchased only once, after the initial purchase of the beneficial service A, even during the use period or after the elapse of the use period, the eligibility to purchase the beneficial service A is not given to the user U3.

Figure 8:
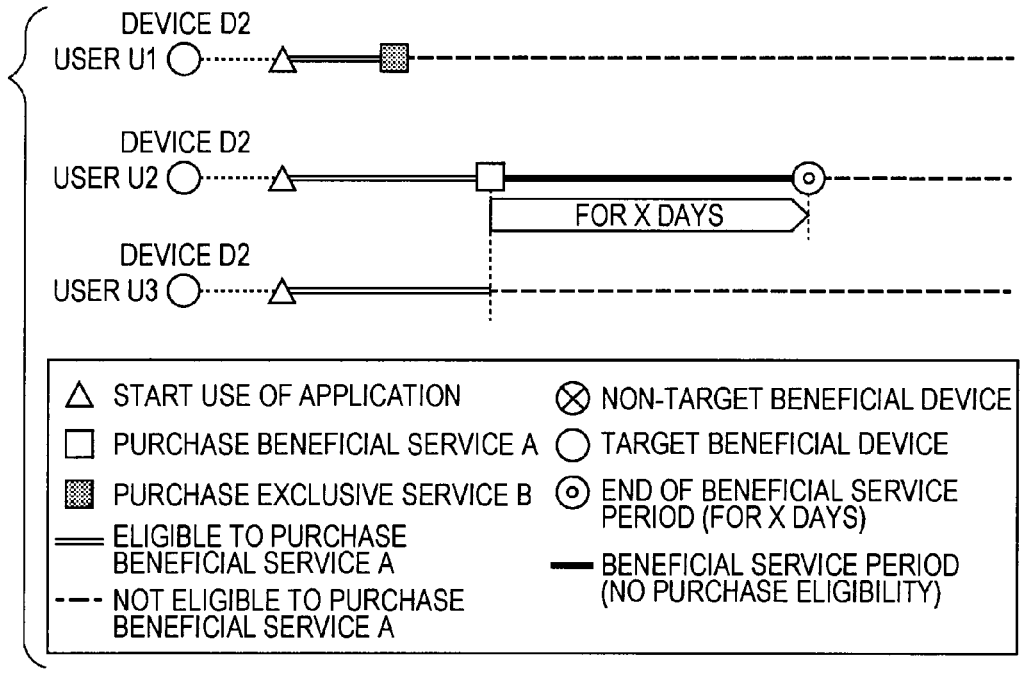
FIG. 8 is a diagram illustrating an example of beneficial service provision according to a first embodiment of the present disclosure.

FIG. 8 shows an example in which the users U1 to U3 share the same device D2 as the client device 200. The device D2 is the target beneficial device. However, the number of users U who can purchase the beneficial service A through the device D2 is limited to one.

Since the device D2 is the target beneficial device, the eligibility to purchase the beneficial service A is given to the users U1 to U3 if the users U1 to U3 starts to use the application for using the service. If on of the users U1 to U3 executes the purchase process of the beneficial service A with the device D2 in this state, it is possible that the user U acquires the use authorization of the beneficial service A.

Here, the user U1 is purchasing the service B of the regular version that is in exclusive relationship with the beneficial service A. In this case, after the purchase of the service B, the eligibility for the user U2 to purchase the beneficial service A disappears. Accordingly, thereafter, so far as the user U1 uses the device D2 that is the target beneficial device, the eligibility to purchase the beneficial service A is not given to the device D2.

However, the disappearance of the eligibility to purchase the beneficial service A with respect to the user U1 does not affect the eligibility to purchase the beneficial service A that the users U2 and U3 has, who are different users sharing the device D2. This is because the server device 100 determines the eligibility to purchase the service using not only the device ID but also the user ID, and thus the usable service of the user U1 and the usable service of the users U2 and U3 are distinctively recognized.

Thereafter, the user U2 purchases the benefit service A and starts the use period of X days. Since the beneficial service A is a service that can be purchased only once, after the initial purchase of the beneficial service A, even during the use period or after the elapse of the use period, the eligibility to purchase the beneficial service A is not given to the user U2.

Further, as the user U2 purchases the beneficial service A, the number of users who have purchased the beneficial service A through the device D2 reaches "1" that is an upper limit. Accordingly, after the user U2 purchases the beneficial service A, the eligibility of the user U3 to purchase the beneficial service A disappears. Thereafter, for example, even if a new user U4 uses the device D2, the eligibility to purchase the beneficial service A is not given.

Figure 9:
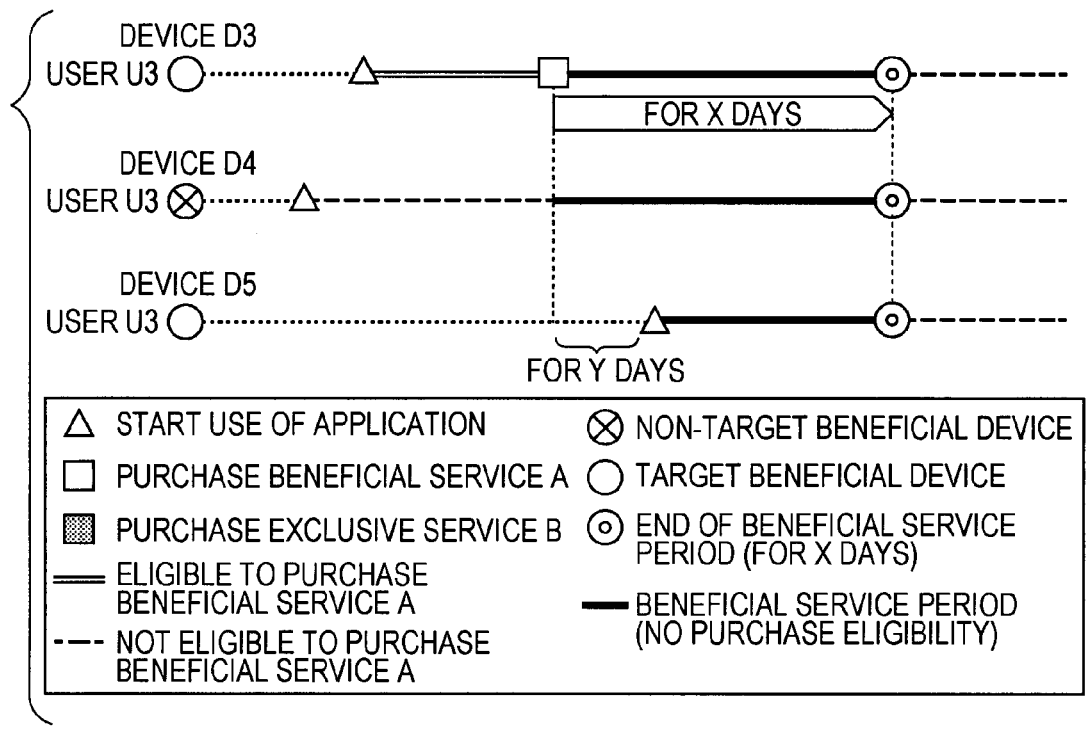
FIG. 9 is a diagram illustrating an example of beneficial service provision according to a first embodiment of the present disclosure.

FIG. 9 shows an example in the case where the user U3 uses different devices D3 to D5 as the client devices 200. The devices D3 and D5 are target beneficial devices, and the device D4 is not a target beneficial device.

Since the device D3 is the target beneficial device, the eligibility to purchase the beneficial service A is given to the user U3 if the user U3 starts to use the application for using the service. The user U3 purchases the beneficial service A using the device D3, and starts the use period for X days.

Only during the use period of X days after the user U3 purchases the beneficial service A, the use of the beneficial service A becomes possible in addition to the device D3 used to purchase the beneficial service A. In this case, the use of the beneficial service A is possible regardless of whether or not the device is the target beneficial device. This is because the server device 100 determines the usable service of the user U through the user ID regardless of the device ID.

The use period of the beneficial service A for the user U3 is counted from the purchase using the device D3. Accordingly, in the device D5 which starts the use of the application for using the service after Y days from the purchase using the device D3, the use period of the beneficial service A becomes (X-Y) days thereafter.

Since the beneficial service A is a service that can be purchased only once, after the initial purchase of the beneficial service A, even during the use period or after the elapse of the use period, the eligibility to purchase the beneficial service A is not given to the user U3. In order for the server device 100 to determine the exclusive relationship between the services on the basis of the user ID, even in the case where the user U3 uses any one of the devices D3 to D5, the eligibility to purchase the beneficial service A is not given to the user U3.

Figure 10:
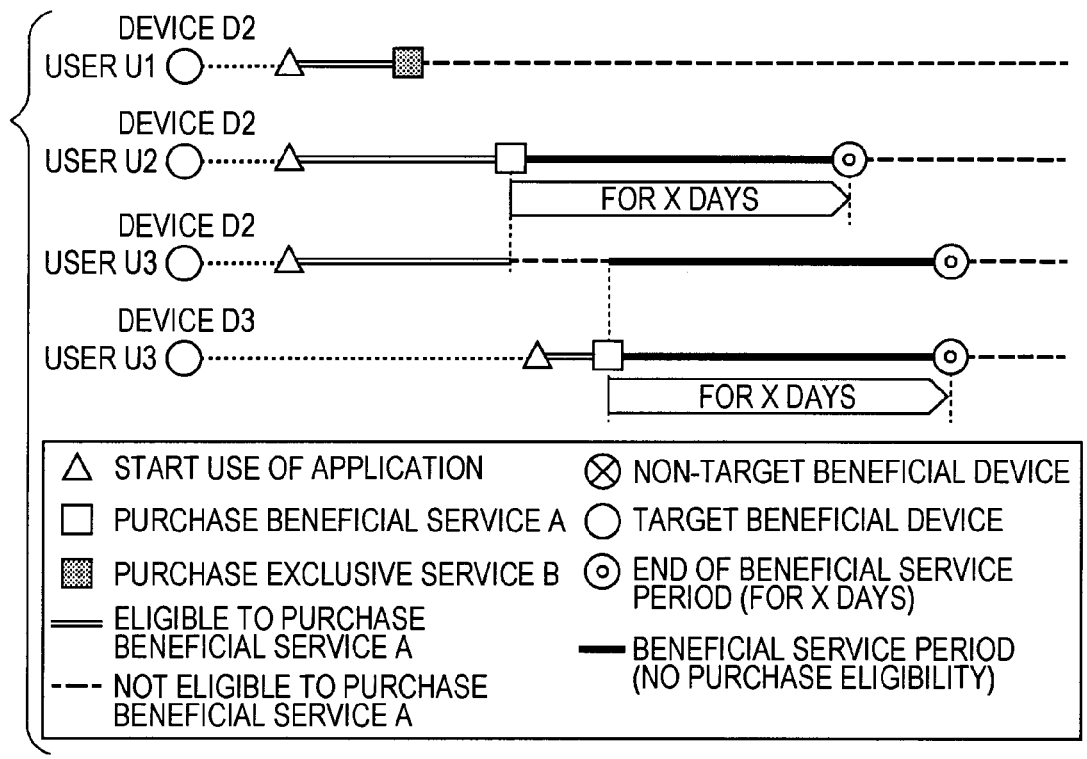
FIG. 10 is a diagram illustrating an example of beneficial service provision according to a first embodiment of the present disclosure.

FIG. 10 shows an example in which the user U3 uses another target beneficial device D3 in addition to the device D2 in an example of FIG. 8. Further, in the following description, the same reference numerals are used for the same portions as those in the example of FIG. 8, and the explanation thereof will be omitted.

As described above, after the user U2 purchases the beneficial service A, the eligibility of the user U3 to purchase the beneficial service A in the device D2 temporarily disappear. However, it is possible for the user U3 to obtain the eligibility to purchase the beneficial service A in the other target beneficial device D3. This is because the beneficial service A is not purchased in the device D3 and also the user U3 does not purchase the beneficial service A. By purchasing the beneficial service A using the eligibility to purchase the beneficial service A in the device D3, it is possible to use the beneficial service A in the device D2.

(Summary)

In the case where the eligibility to purchase the beneficial service is attached as the device purchase benefit as in the above-described example, it is necessary to determine the purchase eligibility in consideration of both conditions on the device side such as if the device is the target of the benefit or if the device has already been used to purchase the beneficial service and conditions on the user side such as if the user U purchases the service that is in exclusive relationship with the beneficial service. The server device 100 according to this embodiment can make a proper determination in the same case as described above through determining the purchase eligibility using both the device ID and the user ID. Further, since the purchased service is related to the user ID, after the user U once purchases the beneficial service, the server device 100 can use the beneficial service in addition to the target beneficial device, and thus the use value of the purchase benefit can be heightened. As described above, the server device 100 can flexibly set the target of service provision by combining the device ID and the user if necessary or by individually using the device ID and the user in managing the authorization to use the service.

2. Second Embodiment

Next, the second embodiment of the present disclosure will be described. In the second embodiment, in addition to the conditions as described above according to the first embodiment, or in replacement of them, the authorization to use the service is determined on the basis of the user's current or past position. Other portions according to the second embodiment are almost the same as those according to the first embodiment. Accordingly, in the following description, portions of the configuration according to the second embodiment, which are different from those according to the first embodiment, will be mainly described, and the description of other portions will be omitted.

2-1. Summary

Figure 11:
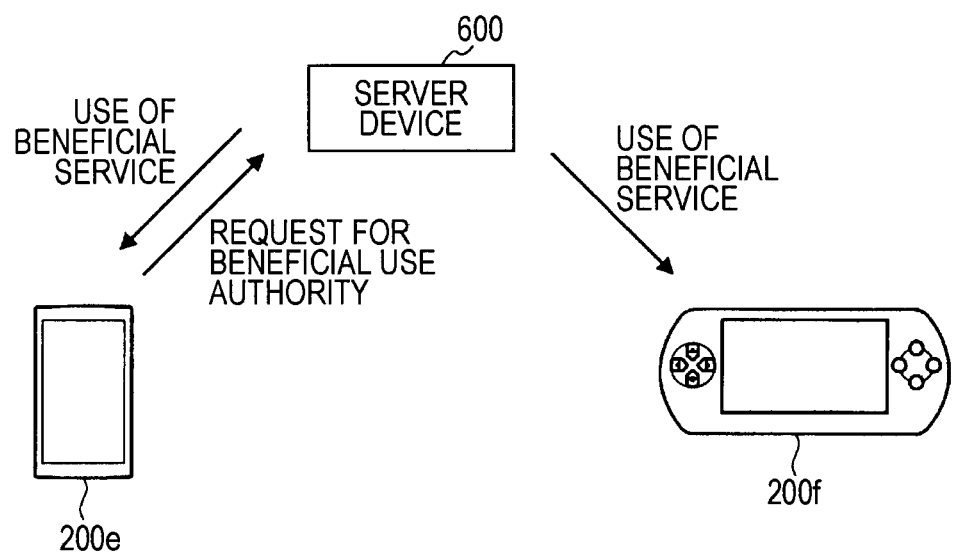
FIG. 11 is a diagram schematically illustrating the way of using beneficial services according to a second embodiment of the present disclosure.
Figure 14:
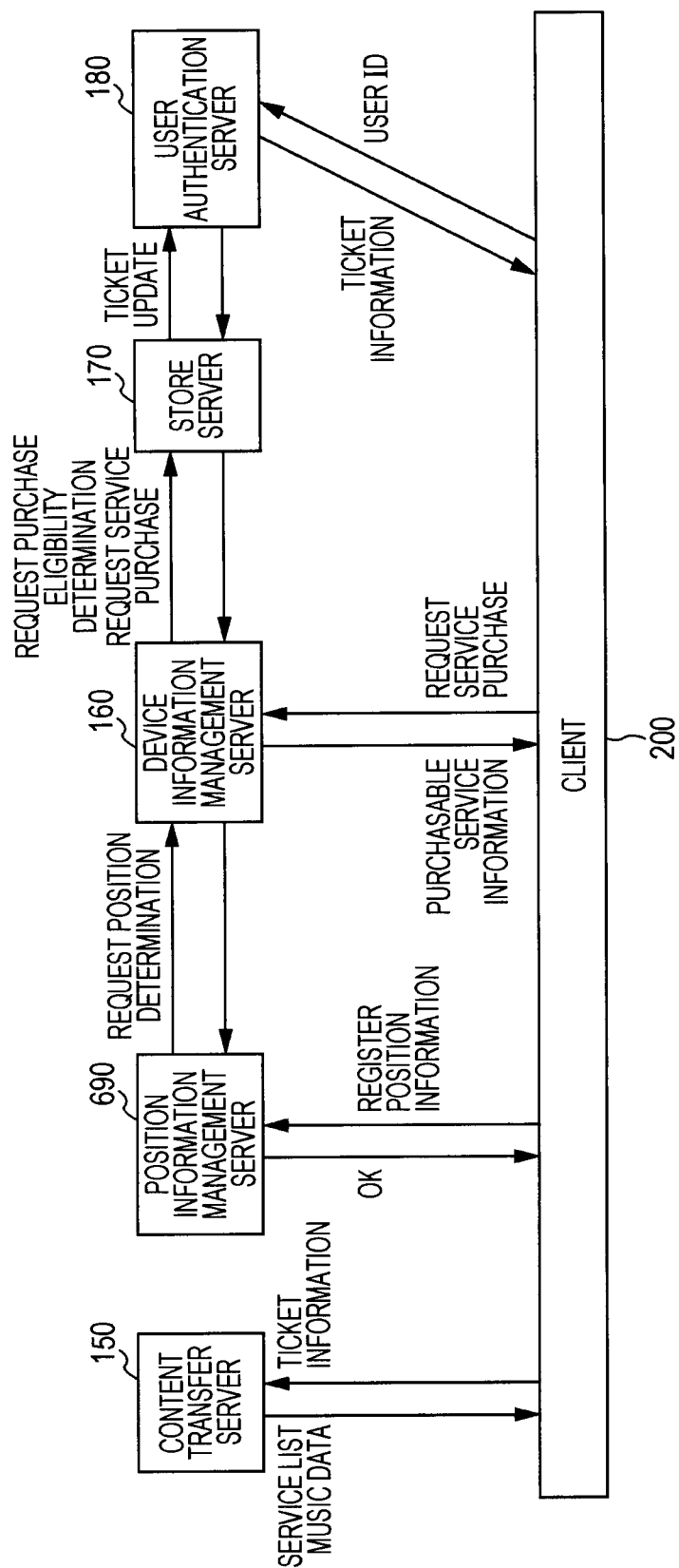
FIG. 14 is a diagram illustrating an example of implementation of a server device and a client device according to a second embodiment of the present disclosure.

FIG. 11 is a diagram schematically illustrating the form of service use according to this embodiment. Referring to FIG. 14, a mobile phone 200e that is a client device transmits an application for authorization to use the benefit to the server device 600. If it is possible to grant the user of the mobile phone 200e with the authorization to use the beneficial service, the server device 600 grants the user the authorization to use the beneficial service, and makes it possible to use the beneficial service in the mobile phone 200e.

At this time, whether or not it is possible to grant the user of the mobile phone 200e with the authorization to use the beneficial service, for example, is determined on the basis of the current position of the user who holds the mobile phone 200e when the user applies for the authorization to use the benefit. This position is the current position of the mobile phone 200e that is the client device. If the position of the mobile phone 200e, for example, is a specified position such as an event venue, the server device 600 determines that it is possible to grant the user of the mobile phone 200e with the authorization to use the benefit.

As another example, whether or not it is possible to grant the user of the mobile phone 200e with the authorization to use the beneficial service may be determined on the basis of the past position of the user who holds the mobile phone 200e. This position, for example, is the past position of the mobile phone 200e that is the client device. If the position of the mobile phone 200e, for example, is a specified position such as an event venue during the event period, the server device 600 determines that it is possible to grant the user of the mobile phone 200e with the authorization to use the benefit.

As illustrated, the beneficial service that can be used in the mobile phone 200e is also usable in a game machine 200f that is another client device that the same user holds. That is, as described above with reference to FIGS. 9 and 10 according to the first embodiment, if a certain user acquires the authorization to use the beneficial service using a certain client device, this beneficial service is also usable in another client device that the same user holds.

Application Example

An example of a scene to which the authorization to use the beneficial service can be applied is described hereinafter. A predetermined position of the user may be, for example, a concert venue, a promotion event venue, an exhibition hall, a shopping mall, a housing exhibition hall, a game even venue, a sport event venue, or the like. Further, a plurality of predetermined positions may be set in addition to a single position.

A predetermined period, for example, may be set between an even start date and time and an event end date and time. For example, in the case where a place that is permanently set such as a shopping mall or a housing exhibition hall is set as the predetermined position, the predetermined period may not be specially set. Further, a plurality of predetermined periods may be set in addition to a single period.

The conditions on which the authorization to use the beneficial service can be granted to the user may be, for example, (a) to grant the user in the predetermined position with the authorization up to a predetermined number of times (it may be once), (b) to grant the user in the predetermined position in the predetermined period, and (c) to grant the authorization to the user who reaches the predetermined number of times the user is present in the predetermined position in the predetermined period (that is, the number of times the user visits the event venue or the like). In the example of (c), if a plurality of predetermined positions or periods are set, histories of the positions or periods may be summed. In this case, a plurality of combined conditions between the user's current or past positions and the predetermined periods are set and the plurality of combined conditions are met to provide the conditions of the use authorization.

The beneficial service, for example, may be a right to view artists' music in a limited period of time, right to play games, right to use game items, right to view promotion images, right to access a web page in a limited period of time, right to issue a special coupon, or the like.

Of course, in the case where the user does not agree to provide position information from the client device, the position information is not provided from the client device to the server device, and thus the right to use the beneficial service subject to the user's position is not granted to the user.

(Example of a Process)

Next, an example of a process of determining the authorization to use the service on the basis of the user's position will be described.

First, a predetermined position is set. The predetermined position, for example, may be set as latitude and longitude information $(X_e, Y_e)$. In this case, "the client device is in the predetermined position" may correspond to the case where if it is assumed that the latitude and longitude information of the client device is set to $(X_{user}, Y_{user})$, the conditions $(X_e + d1 < X_{user} < X_e + d2)$ and $(Y_e - d3 < Y_{user} < Y_e + d4)$ are satisfied. Here, d1, d2, d3, and d4 are parameters that define the size of a range of the predetermined position, and for example, are determined by the size of an event venue that is the predetermined position, the size of an error that is allowed for user's position information, and the like.

Next, the position information is acquired from the client device. The position information, for example, is received by the reception unit 102 of the server device 600 together with the device ID or the user ID. The client device 200, for example, may have a function of specifying its own position using a GPS (Global Positioning System) receiver. In this case, the position information is provided to the server device 600 in the same manner as the latitude and longitude information (Xuser, Yuser).

Further, the client device 200 may not have the function of specifying its own position. For example, the position of the client device 200 may be specified using information of Wi-Fi (registered trademark) base station with which the client device 200 communicates. As described above, for example, the positional data of the user obtained through the client device 200 may be specified using any existing method.

Next, it is determined whether or not it is possible to grant the user authorization to use the service. For example, in the case of the determination on the basis of the user's current position, the predetermined position and the user's current position are matched (whether or not the conditions (Xe−d1<Xuser<Xe+d2) and (Ye−d3<Yuser<Ye+d4) are satisfied), and it is determined that the service related to the information (Xe, Ye) of the matched position is the service of which the use authorization can be granted to the user.

Further, in the case of the determination on the basis of the history of the user's position, the user's position in the predetermined period is extracted from the history of the user's position information. The user's position in the predetermined period and the predetermined position are matched (whether or not the conditions (Xe−d1<Xuser<Xe+d2) and (Ye−d3<Yuser<Ye+d4) are satisfied), and it is determined that the service related to the information (Xe, Ye) of the matched position is the service of which the use authorization can be granted to the user.

The above-described process may be a search for the history of the user's position information on the conditions such as the predetermined position and the predetermined period of time. Further, in this case, the number of times the user's position and the predetermined position are matched in the predetermined period of time is counted, and this number may be used as the condition in determining whether or not it is possible to grant the use authorization.

Here, timing to obtain the user's position information and management of the obtained position information will be described.

(In Case of Obtaining the Current Position)

In the case of determining whether or not to grant the authorization to use the service on the basis of the user's current position, the position information, for example, may be obtained according to the request from the client device. For example, the user who has reached the predetermined position such as the even venue or the like transmits a position information reception request from the client device 200 to the server device 600 so as to obtain the authorization to use the beneficial service that can be used in the position. This position information reception request may be transmitted together with the position information of the client device 200.

The reception unit 102 of the server device 600 that has received the position information reception request receives the position information of the client device 200. The server device 600 determines whether or not it is possible to grant the user the authorization to use the beneficial service using the position information. The service information that is determined it is possible to grant the user the use authorization is transmitted from the transmission unit 118 of the server device 600 to the client device 200.

(In Case of Obtaining the Past Position-1)

In the case of determining whether or not to grant the authorization to use the service on the basis of the user's past position, the position information is maintained in any form as a history. Here, two examples of maintaining the history of such position information will be described.

First, an example of maintaining the history of the position information in the server device 600 will be described. In this case, the position information, for example, is periodically transmitted from the client device 200 to the server device 600 according to the user's operation. The server device 600 maintains the history of the position information received from the client device 200. The range of the maintained history, for example, may be limited by the number of data (the number of times the position information is received) or the period.

As described above, the position information may be periodically transmitted from the client device 200 to the server device 600. However, if the position information is transmitted in a short period, data that is accumulated in the server device 600 becomes massive, and load to a battery of the client device 200 or communication resources becomes large. On the other hand, if the position information is transmitted in a long period, although the user is actually present in the predetermined place such as the event venue, the position information is not transmitted in the meantime, and thus there is a possibility that the authorization to use the beneficial service is unable to be obtained.

Accordingly, even in this case, as in the example of using the current position information, it is preferable that the position information reception request is transmitted from the client device 200 to the server device 600 and the reception unit 102 of the server device 600 receives the position information according to the position information reception request. For example, although the user who has reached the predetermined position such as the event venue transmits the position information request from the client device 200 to the server device 600, the user may not perform any further operation in the place. The user, for example, may perform the operation for obtaining the authorization to use the beneficial service using the position information when the user was in the event venue using the client device 200 after coming back to home.

Further, the operation for obtaining the use authorization may not be performed necessarily using the client device 200 that has transmitted the position information. For example, if the history of the position information in association with the user ID is managed by the server device 600, it is possible to correctly grant the user the authorization to use the beneficial service even in the case where the user performs the operation for obtaining the use authorization using another client device 200.

(In Case of Obtaining the Past Position-2)

Next, an example of maintaining the history of the position information in the client device 200 will be described. In this case, the position information is obtained by the client device 200, and is maintained in a secure form as the history in the client device 200. In the same manner as the above-described example, the range of the maintained history, for example, may be limited by the number of data (the number of times the position information is received) or the period.

The history of the position information that is maintained in the client device 200 may be transmitted from the client device 200 to the server device 600 when the user performs the operation for obtaining the authorization to use the beneficial service. The history of the position information, for example, may be periodically transmitted from the client device 200 to the server device 600 at night having less traffic. Through this, for example, in the case where the operation for obtaining the use authorization is performed, the position history that is transmitted from the client device 200 to the server device 600 can be limited to the difference from the previous periodic transmission, and thus the traffic is reduced. Further, improper acquisition of the use authorization through falsification of data on the side of the client device 200 can be prevented.

(Use of a Plurality of Client Devices or the Like)

In the two examples as described above, the user can extract the user's position history through integration of the position information of the plurality of client devices 200 that the user uses, and use the extracted history for the determination. For example, in the example of FIG. 11, the server device 600 may make the user's position history through integration of the history of the position information of the mobile phone 200e and the game machine 200f which are used by the same user, and may determine whether or not it is possible to grant the user the authorization to use the beneficial service on the basis of the user's position history.

In this example, it is assumed that the authorization to use the beneficial service is granted to the user who has visited a certain event venue three times during the event time. In this case, for example, if it is assumed that the user has twice visited the event venue to carry the mobile phone 200e and has once visited the event venue to carry the game machine 200f, the server device 600 may determine that it is possible to grant the user the authorization to use the beneficial service. Of course, the user's operation for obtaining the use authorization may correspond to the mobile phone 200e, the game machine 200f, or another client device, for example, a PC or the like.

2-2. Configuration of a Server Device

Figure 12:
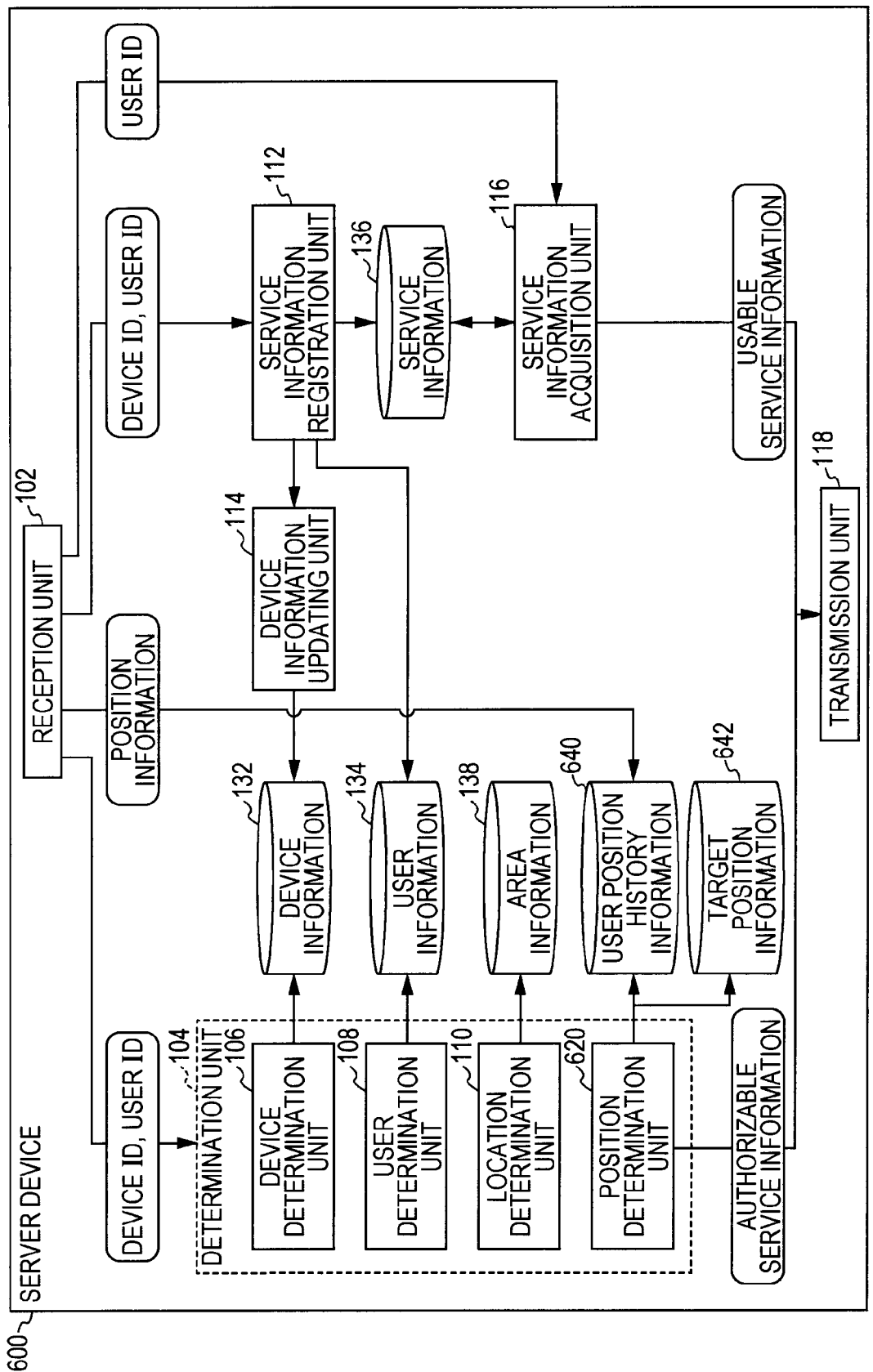
FIG. 12 is a diagram illustrating the schematic functional configuration of a server device according to a second embodiment of the present disclosure.

Next, referring to FIG. 12, the configuration of the server device according to the second embodiment of the present disclosure will be described. FIG. 12 is a diagram illustrating the schematic functional configuration of the server device according to the second embodiment of the present disclosure.

The server device 600 according to this embodiment includes a position determination unit 620 that is provided in the determination unit 104. Further, in the internal or external storage device of the server device 600, user position history information 640 and target position information 642 may be stored. Since other configuration elements are almost the same as those of the server device 100 according to the first embodiment, the same reference numerals are given thereto, and the detailed description thereof will be omitted.

(Position Determination Unit)

The position determination unit 620 determines whether or not it is possible to grant the user U with authorization to use the service on the basis of the user's current or past position. The position determination unit 620 may use the position information of one or a plurality of client devices 200 that the user U uses as the information that indicates the current or past position of the user U. As described above, the position information of the client device 200, for example, may be identified as specified latitude and longitude information using a GPS receiver or the like. The position information of the client device 200, for example, is received by the reception unit 102 from the client device 200, and is stored as user position history information 640.

Further, in the case where the position determination unit 620 uses only the user's current position for the determination, the user position history information 640 may not necessarily be stored. That is, the position determination unit 620 may use the position information of the client device 200 received by the reception unit 102 as it is during the determination. Further, even in the case where the position information of the client device 200 is maintained on the side of the client device 200, the user position history information 640 may not necessarily be stored. In this case, the position determination unit 620 may use the position history information of the client device 200 received by the reception unit 102 during the determination. As described above, even in the case where the position history information is received from the client device 200, the user position history information 640 may be stored on the side of the server device 600 to prevent the reduction of the amount of communication due to the difference acquisition or falsification of data.

In the target position information 642, position information for granting the user U with the authorization to use the service is maintained in association with each service. The target position information 642, for example, includes latitude and longitude information (in the above-described example, (Xe, Ye)) and parameters (in the above-described example, d1, d2, d3, and d4) that define the size of the range. The target position information 642 further includes information of the predetermined period of time (between the event start date and time and the event end date and time) and the number of times the user has to satisfy the conditions (for example, three times visit during the even period).

Further, the position determination unit 620 may extract not only the service of which the authorization can be granted at the current time but also the service of which the authorization can be granted through movement of the user U to a predetermined position from now on, and provide the information to the transmission unit 118 as "conditional authorizable service information". This service, for example, may be a service for which the predetermined period that is the condition has not yet elapsed and the condition of the position of the user U is not satisfied. This service information may be presented to the user in such a form "If you go to the event venue till January 30, the beneficial services are available." In this case, the service information that is presented to the user U, for which the predetermined position is in the vicinity of the current position of the user U, may be preferentially presented.

2-3. Process of Determining Whether or not to Grant Authorization

Figure 13:
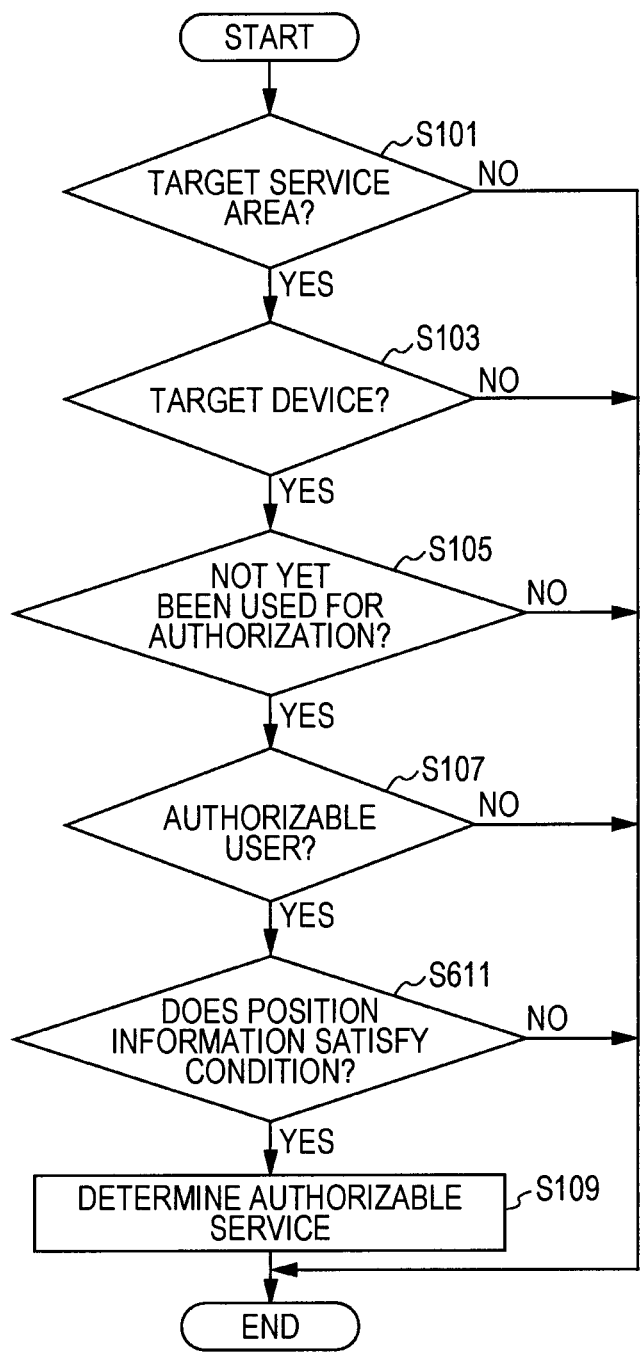
FIG. 13 is a flowchart illustrating an example of a process of determining whether or not to grant the use authorization in a server device according to a second embodiment of the present disclosure.

Next, referring to FIG. 13, an example of a process of determining whether or not to grant the use authorization in the server device according to the second embodiment of the present disclosure will be described. FIG. 13 is a flowchart illustrating an example of a process of determining whether or not to grant the use authorization in the server device 600 according to the second embodiment of the present disclosure.

Since the process of the illustrated flowchart, except for step S611, is almost the same as the flowchart according to the first embodiment with reference to FIG. 3, the same reference numerals are given thereto, and the detailed description thereof will be omitted.

If it is determined that the user is a user to whom the authorization to use the service can be granted in step S107, the position determination unit 620 determines whether or not the user's current or past position satisfies the conditions for the use authorization on the basis of the position information or position history information of the client device 200 (step S611). If it is determined that the user U is the user to whom the authorization to use the service can be granted in step S611, the determination unit 104 determines that the service to be determined is a service of which the use authorization can be granted to the user U (step S109).

2-4. Flow of Information Between a Server and a Client

Figure 15:
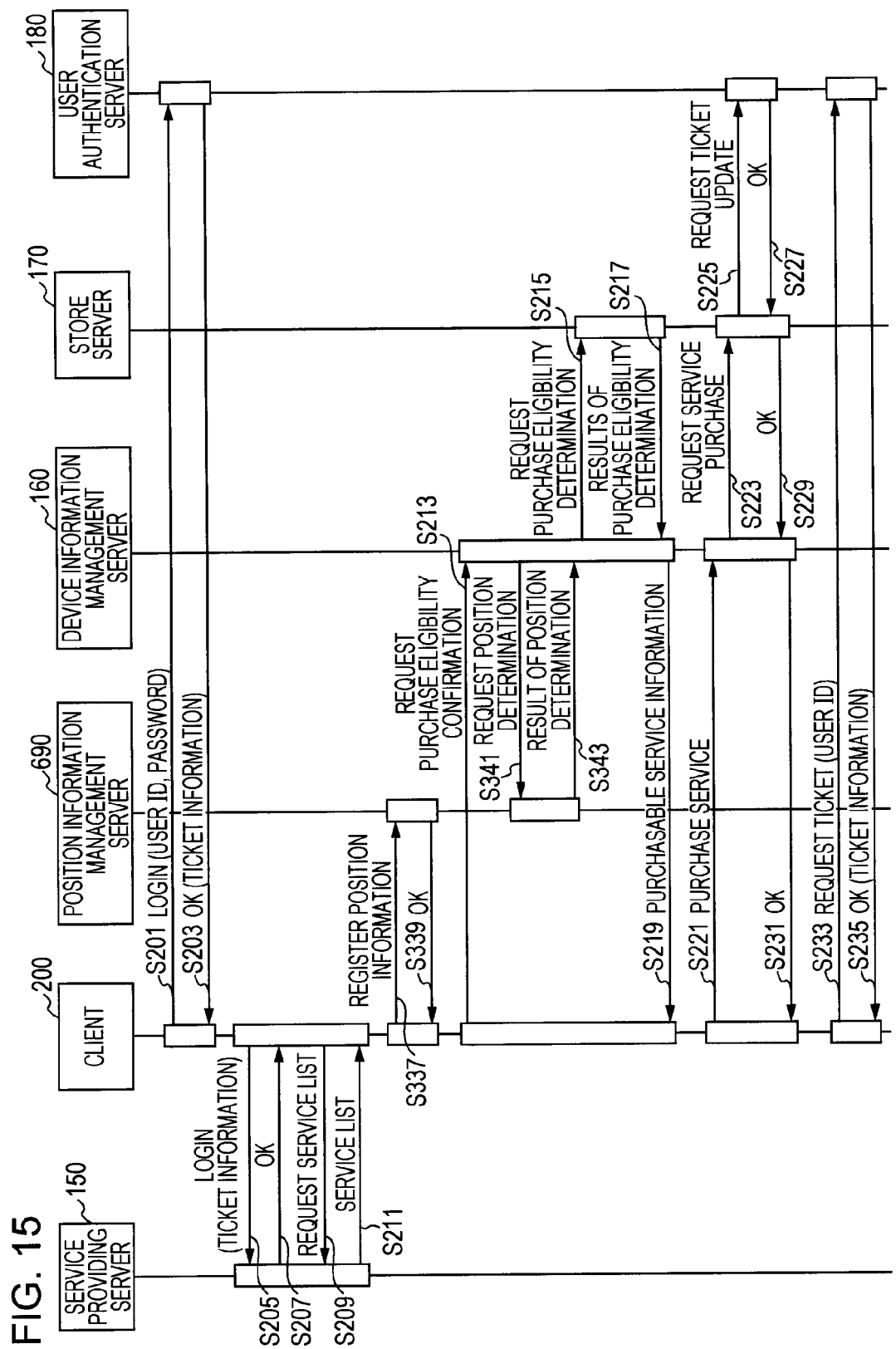
FIG. 15 is a sequence diagram illustrating flow of information between respective devices in the example of FIG. 14.

Next, referring to FIGS. 14 and 15, the flow of information between the server and the client according to the second embodiment of the present disclosure will be described. FIG. 14 is a diagram illustrating an example of implementation of the server device 600 and the client device 200 according to the second embodiment of the present disclosure. FIG. 15 is a sequence diagram illustrating the flow of information between the respective devices in the example of FIG. 14.

(Implementation Example of a Server Device)

Referring to FIG. 14, according to this embodiment, the server device 600 may be implemented as a content distribution server 150, a device information management server 160, a store server 170, a user authentication server 180, and a position information management server 690. Hereinafter, the function of the position information management server 690 will be described. Since other servers are almost the same as those according to the first embodiment, the same reference numerals are given thereto, and the detailed description thereof will be omitted.

The position information management server 690 is a server which has the function of the above-described position determination unit 620 and maintains user position history information 640 and target position information 642. The position information management server 690 receives registration of the position information from the client device 200. Further, the position information management server 690 is requested to determine whether or not to grant the use authorization on the basis of the position history by the device information management server 160.

Here, the target position information 642 may be maintained in the position information management server 690 as described above, or may be maintained in the store server 170. In the case where the target position information 642 is maintained in the store server 170, the device information management server 160 or the position information management server 690 inquires of the store server 170 about the conditions for the position information.

(Flow of Information Between Devices)

Referring to FIG. 15, the flow of information between respective servers will be described. Since the illustrated flow of information, except for steps S337 to S343, is almost the same as that according to the first embodiment, the same reference numerals are given thereto, and the detailed description thereof will be omitted.

In the illustrated example, the client device 200 registers the position information in the position information management server 690 after the service list is transmitted to the client device 200 in step S211 (step S337). The position information management server 690 registers information that corresponds to the position information of the client device 200 in the user position history information 640 according to the request from the client device 200 and transmits a response indicating that the registration of the position information is successful to the client device 200 (step S339).

Thereafter, the client device 200, in the same manner as the first embodiment, transmits a purchase eligibility confirmation request to the device information management server 160 together with the service list acquired from the content distribution server 150 (step S213). The device information management server 160 determines whether or not the user U who uses the client device 200 has purchase eligibility, that is, whether or not it is possible to grant the user U with the use authorization, with respect to each service included in the service list.

Among them, the device information management server 160 requests purchase eligibility determination using the user's position information from the position information management server 690 (step S341). The position information management server 690 that has received the determination request determines whether or not it is possible to grant the user U with the use authorization with reference to the user position history information 640 and the target position information 642, and transmits the result to the device information management server 160 (step S343). Here, the position information management server 690 maintains the history in which the determination using the position information of the user U has been successful, and may use this, for example, in determining the number of times that becomes conditions for the use authorization for each user U.

The device information management server 160 transmits the authorizable service information that is obtained as the result of the determination including the determination by the position information management server 690 to the client device 200 as the purchasable service information (step S219).

(Summary)

As described above, the server device 600 according to this embodiment, for example, may utilize the beneficial service provision as an incentive for the user to take user's steps toward the event venue or the like through determining the purchase eligibility further using the user's position information. The user's position information, for example, may be acquired as the position information of the client device 200 as described above. In this embodiment, for example, the beneficial service, which can be used by the position information registered by a certain client device 200, can also be used even in another client device 200 that the user uses. Further, the position information that is registered by the user using a plurality of client devices 200 may be registered in association with the same user. Further, by combining the positional conditions and the periodic conditions or by making the conditions in which the conditions are satisfied multiple times as the conditions for using the beneficial service, for example, it becomes easier to encourage a desired behavior to the user using the beneficial service.

3. Hardware Configuration

Figure 16:
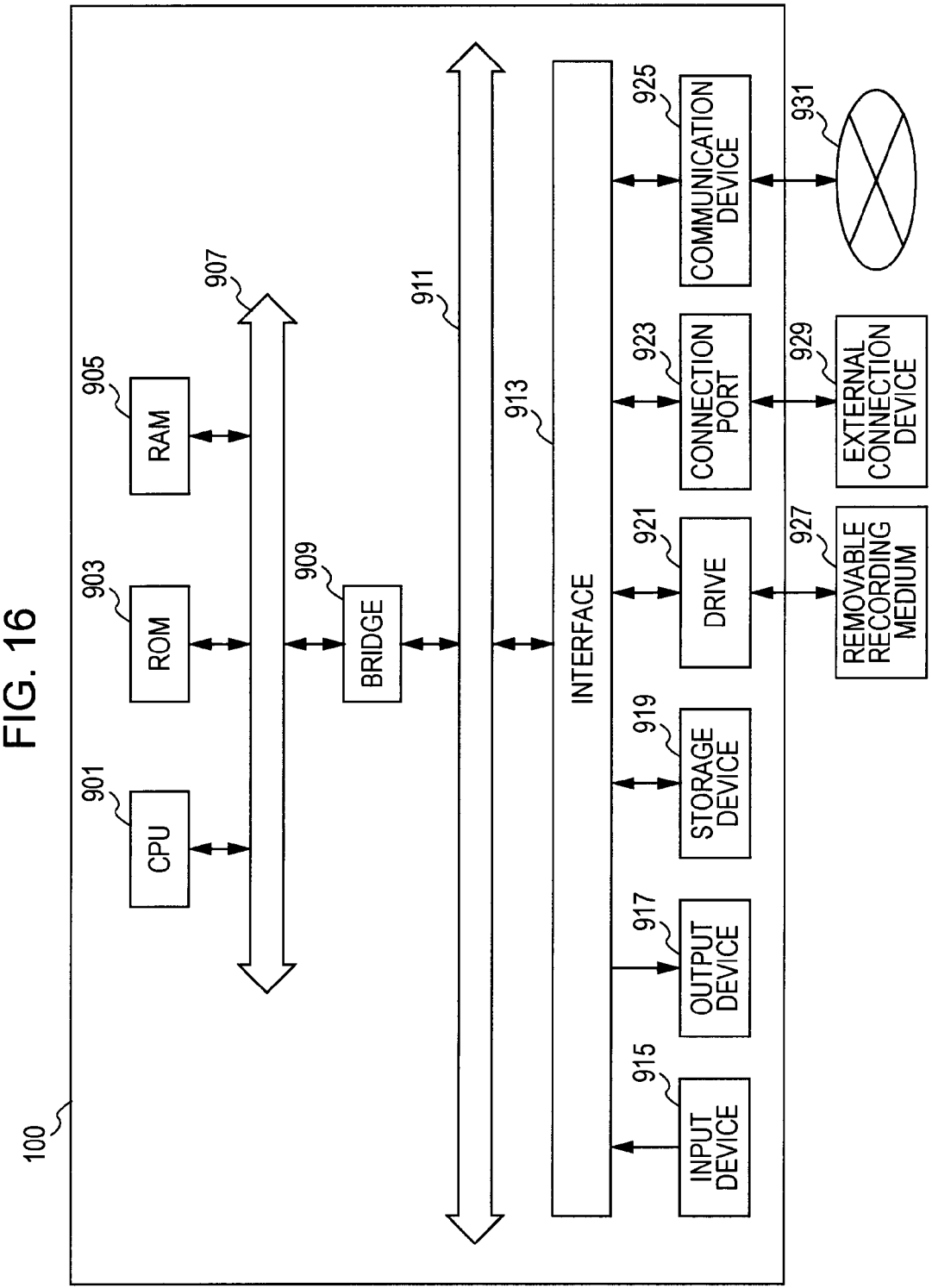
FIG. 16 is a block diagram illustrating the hardware configuration of a server device according to embodiments of the present disclosure.

Next, referring to FIG. 16, hardware configuration of the server device 100 according to the above-described embodiments of the present disclosure will be described in detail. FIG. 16 is a block diagram illustrating the hardware configuration of the server device 100 according to an embodiment of the present disclosure. Further, the same hardware configuration may be applied to the client device 200.

The server device 100 includes a CPU 901, a ROM 903, and a RAM 905. Further, the server device 100 may include a host bus 907, a bridge 909, an external bus 911, an interface 913, an input device 915, an output device 917, a storage device 919, a drive 921, a connection port 923, and a communication device 925.

The CPU 901 functions as an arithmetic processing device and a control device, and controls entirely or partly the operation in the server device 100 according to various kinds of programs recorded in the ROM 903, the RAM 905, a storage device 919, or a removable recording medium 927. The ROM 903 stores a program that is used by the CPU 901 or operation parameters. The RAM 905 primarily stores a program that is used during the execution of the CPU 901 or parameters properly changed during the execution. They are connected to one another by the host bus 907 that is configured by an internal bus such as a CPU bus or the like.

The host bus 907 is connected to the external bus 911 such as PCI (Peripheral Component Interconnect/Interface) bus or the like, through the bridge 909.

The input device 915, for example, is an operation means operated by the user, such as a mouse, a keyboard, a touch panel, buttons, switches and levers. Further, the input device 915, for example, may be a remote control means using infrared rays or other radio waves, or may be an external connection device 929 such as a mobile phone or PDA that corresponds to the operation of the server device 100. Further, the input device 915, for example, generates an input signal on the basis of the information input by the user using the above-described operation means, and is configured by an input control circuit or the like, that outputs to the CPU 901. The user of the server device 100 can input various kinds of data or instruct processing operations with respect to the server device 100 through operation of the input device 915.

The output device 917 is configured by a device that can visually or audibly notify the user of the acquired information. Such device may be a display device, such as a CRT display device, a liquid crystal display device, a plasma display device, an EL display device, or a lamp, an audio output device such as a speaker and a headphone, a printer device, a mobile phone, a facsimile, or the like. The output device 917, for example, outputs the results that are obtained by various kinds of processes performed by the server device 100. Specifically, the display device displays the results obtained through eh various kinds of processes performed by the server device 100 with text or images. On the other hand, the audio output device converts the audio signal that is composed of reproduced audio data or sound data into an analog signal.

The storage device 919 is a device for storing data that is configured as an example of the storage unit of the server device 100. The storage device 919, for example, may be a magnetic storage device such as HDD (hard Disk Drive), a semiconductor storage device, an optical storage device or a magneto-optical storage device. This storage device 919 stores programs executed by the CPU 901, various kinds of data, and various kinds of data acquired from the outside.

The drive 921 is a reader/writer for recording medium, and is built in the server device 100 or is attached to the outside of the server device 100. The drive 921 reads information that is recorded in a removable recording medium 927, such as a magnetic disk, an optical disk, a magneto-optical disk, or a semiconductor memory mounted therein, and outputs the read information to the RAM 905. Further, the drive 921 can write the record on the removable recording medium 927, such as the magnetic disk, the optical disk, the magneto-optical disk, or the semiconductor memory mounted therein. The removable recording medium 927, for example, may be DVD media, HD-DVD media, Blu-ray (registered trademark) media, or the like. Further, the removable recording medium 927 may be a Compact Flash (CF) (registered trademark), a flash memory, or an SD memory card (Secure Digital memory card). Further, the removable recording medium 927, for example, may be an IC card (Integrated Circuit card) mounting a non-contact type IC tip, or an electronic device.

The connection port 923 is a port for directly connecting the device to the server device 100. Examples of the connection port 923 may include a USB (Universal Serial Bus) port, an IEEE1394 port, and an SCSI (Small Computer System Interface) port. Other examples of the connection port 923 may include an RS-232 C port, an optical audio terminal, and an HDMI (High-Definition Multimedia Interface) port. By connecting the external connection device 929 to the connection port 923, the server device 100 acquires various kinds of data directly from the external connection device 929 or provides various kinds of data to the external connection device 929.

The communication device 925, for example, is a communication interface that is configured by a communication device for connecting to a communication network 931. The communication device 925, for example, is a communication card for wired or wireless LAN, Bluetooth (registered trademark), or WUSB (Wireless USB). Further, the communication device 925 may be an optical communications router, an ADSL (Asymmetric Digital Subscriber Line) router or various kinds of communications modem. This communication device 925, for example, may transmit/receive signals, for example, in line with predetermined protocols such as TCP/IP, between the Internet and other communications devices. Further, the communication network 931 that is connected to the communication device 925 is configured by a wired or wireless connection network, and for example, may be the internet, home LAN, infrared communications, radio wave communications, or satellite communications.

As described above, an example of the hardware configuration of the server device 100 has been shown. The above-described configuration elements may be configured using a general-purpose members or may be configured by hardware specified to the functions of the respective configuration elements. Accordingly, in implementing the above-described embodiments, it is possible to properly change the used hardware configuration according to the technical level when implementing the above-described embodiments.

4. Supplement

As described above, although preferred embodiments of the present disclosure have been described in detail with reference to the accompanying drawings, the present disclosure is not limited to such examples. It should be understood by those skilled in the art that various modifications, combinations, sub-combinations and alterations may occur depending on design requirements and other factors insofar as they are within the scope of the appended claims or the equivalents thereof.

Further, the technology according to the present disclosure may adopt the same configurations as those below.

(1) A server device including:

a reception unit receiving device identification information of a client device and user identification information of a user of the client device from the client device;

a device determination unit determining whether or not it is possible to grant the user authorization to use a service on the basis of the device identification information;

a user determination unit determining whether or not it is possible to grant the user the use authorization on the basis of the user identification information; and a transmission unit transmitting information on the authorizable services of the services, for which it is determined that it is possible to grant the user the use authorization on the basis of the device identification information and the user identification information, to the client device.

(2) The energy charging apparatus as described in (1), further including a service information registration unit executing the use authorization through registration of information on the service, which is designated in response to an authorization request, in association with the user identification information, wherein the reception unit receives the authorization request that designates any one of the authorizable services from the client device.

(3) The server device as described in (2), further including a service information acquisition unit acquiring the information on the service registered in association with the user identification information as usable service information by the user, wherein the transmission unit transmits the usable service information to a plurality of client devices used by the user.

(4) The server device as described in (2) or (3), further including a device information updating unit registering the information on the service, which is designated in response to the authorization request, in association with the device identification information when the use authorization is executed, wherein the device determination unit determines whether or not it is possible to grant the user the use authorization on the basis of the information of the service registered in association with the device identification information.

(5) The server device as described in any one of (2) to (4), wherein the user determination unit determines whether or not it is possible to grant the user the use authorization on the basis of the information of the service registered in association with the user identification information.

(6) The server device as described in any one of (2) to (5), wherein the service information registration unit registers information on a validity period of the service in association with the user identification information.

(7) The server device as described in any one of (1) to (6), further including a location determination unit determining whether or not it is possible to grant the user the use authorization on the basis of a location of the client device, wherein the reception unit receives location information that indicates the location of the client device from the client device.

(8) The server device as described in any one of (1) to (7), further including a position determination unit determining whether or not it is possible to grant the user the use authorization on the basis of a user's current or past position.

(9) The server device as described in (8), wherein the reception unit receives position information that indicates the position of the client device from the client device, and the position determination unit uses the position information of one or a plurality of client devices used by the user as information that indicates the user's current or past position.

(10) The server device as described in (9), wherein the position determination unit determines whether or not it is possible to grant the user the use authorization on the basis of the user's position in a predetermined period, which is extracted from a history of the position information.

(11) The server device as described in (9) or (10), wherein the reception unit receives a position information reception request that requests reception of the position information from the client device, and receives the position information according to the position information reception request.

(12) The server device as described in (8), wherein the reception unit receives position history information that indicates a history of the position of the client device from the client device, and the position determination unit determines whether or not it is possible to grant the user the use authorization on the basis of the user's position in a predetermined period, which is extracted from the position history information of one or a plurality of client devices used by the user.

(13) The server device as described in any one of (8) to (12), wherein the position determination unit sets a plurality of combined conditions of the user's current or past position and a predetermined period, and if the plurality of combined conditions are met, determines that it is possible to grant the user the use authorization.

(14) The server device as described in any one of (1) to (13), wherein the transmission unit transmits information for displaying the authorizable service to the client device.

(15) A service provision method including:

receiving device identification information of a client device and user identification information of a user of the client device from the client device;

determining whether or not it is possible to grant the user authorization to use a service on the basis of the device identification information;

determining whether or not it is possible to grant the user the use authorization on the basis of the user identification information; and transmitting information on the authorizable services of the services, for which it is determined that it is possible to grant the user the use authorization on the basis of the device identification information and the user identification information, to the client device.

The present disclosure contains subject matter related to that disclosed in Japanese Priority Patent Application JP 2011-075769 filed in the Japan Patent Office on Mar. 30, 2011 and Japanese Priority Patent Application JP 2012-008594 filed in the Japan Patent Office on Jan. 19, 2012, the entire contents of which are hereby incorporated by reference.

What is claimed is:

1. A server device, comprising:
a communication device configured to receive, from a client device, device identification information of the client device and user identification information of a user of the client device;
a processor configured to determine:
whether to grant the user a first authorization to use a service on the client device on the basis of the device identification information, the service being selected from a plurality of services; and
whether to grant the user a second authorization to use the service on the basis of the user identification information, on the basis of position history information obtained from another client device associated with the user, and on the basis of an exclusive relationship between the services, wherein the exclusive relationship indicates at least one service out of the plurality of services can only be used once by the user, wherein
the communication device is configured to transmit, to the client device, information on the service in an event the processor has determined to grant the first authorization and the second authorization.

2. The server device according to claim 1, wherein:
the communication device is configured to receive, from the client device, an authorization request for the service, and
the processor is configured to register information on the service in association with the user identification information when the second authorization has been determined to be granted.

3. The server device according to claim 2, wherein the communication device is configured to transmit the information to the client device.

4. The server device according to claim 2, wherein the processor is configured to:

register the information in association with the device identification information Begin underline in an event the first authorization has been granted, and
determine whether to grant the user the second authorization on the basis of the information.

5. The server device according to claim 2, wherein the processor is configured to register information on a validity period of the service in association with the user identification information.

6. The server device according to claim 1, wherein:
the communication device is configured to receive, from the client device, location information indicating a location of the client device, and
the processor is configured to determine whether to grant the user the second authorization on the basis of the location of the client device.

7. The server device according to claim 1, wherein the processor is configured to determine whether to grant the user the second authorization on the basis of a current position or a past position of the user.

8. The server device according to claim 7, wherein:
the communication device is configured to receive, from the client device, position information indicating a position of the client device, and
the processor is configured to use the position as the current position or the past position of the user.

9. The server device according to claim 8, wherein the processor is configured to extract a predetermined position within a predetermined time period from a history of the position information, and wherein the processor is configured to determine whether to grant the user the second authorization on the basis of a number of times the user is present in the predetermined position within the predetermined time period.

10. The server device according to claim 8, wherein the communication device is configured to:
receive a position information reception request from the client device, and
receive the position information from the client device.

11. The server device according to claim 8, wherein:
the communication device is configured to receive, from the client device, position history information indicating a history of a predetermined position of the client device, and
the processor is configured to extract the predetermined position from the received position history information.

12. The server device according to claim 7, wherein the processor is configured to grant the second authorization based on the current position or the past position of the user in a predetermined time period.

13. The server device according to claim 1, wherein the communication device is configured to transmit, to the client device, information for displaying the service.

14. A computer-implemented service provision method, comprising:
receiving, from a client device, device identification information of the client device and user identification information of a user of the client device;
determining, on the basis of the device identification information, whether to grant the user a first authorization to use a service, the service being selected from a plurality of services;
determining, on the basis of the user identification information, on the basis of position history information obtained from another client device associated with the user, and on the basis of an exclusive relationship between the services, wherein the exclusive relationship indicates at least one service out of the plurality of services can only be used once by the user, whether to grant the user a second authorization to use the service; and
transmitting, to the client device, information on the service in an event the first authorization and the second authorization have been determined to be granted.

15. A non-transitory computer-readable medium storing instructions, which when executed by a processor, causes a computer to execute a service provision method, comprising:
receiving, from a client device, device identification information of the client device and user identification information of a user of the client device from the client device;
determining, on the basis of the device identification information, whether to grant the user a first authorization to use a service, the service being selected from a plurality of services;
determining, on the basis of the user identification information, on the basis of position history information obtained from another client device associated with the user, and on the basis of an exclusive relationship between the services, wherein the exclusive relationship indicates at least one service out of the plurality of services can only be used once by the user, whether to grant the user a second authorization to use the service; and
transmitting, to the client device, information on the service in an event the first authorization and the second authorization have been determined to be granted.

16. The server device according to claim 1, wherein the processor is configured to grant the first authorization for a first time period.

17. The server device according to claim 16, wherein the processor is configured to grant the second authorization for a second time period.

* * * * *